US012097630B2

(12) United States Patent
Korn et al.

(10) Patent No.: US 12,097,630 B2
(45) Date of Patent: Sep. 24, 2024

(54) FOLDABLE MANUAL FOOD-SLICING APPARATUS AND CORRESPONDING METHOD

(71) Applicant: LES PROMOTIONS ATLANTIQUES INC., Longueuil (CA)

(72) Inventors: Eric Korn, Longueuil (CA); Stéphane Béliveau, Longueuil (CA); Jean-Sébastien Lowe, Longueuil (CA)

(73) Assignee: LES PROMOTIONS ATLANTIQUES INC., Longueuil (CA)

( * ) Notice: Subject to any disclaimer, the term of this patent is extended or adjusted under 35 U.S.C. 154(b) by 76 days.

(21) Appl. No.: 17/654,218

(22) Filed: Mar. 9, 2022

(65) Prior Publication Data

US 2023/0226710 A1 Jul. 20, 2023

(30) Foreign Application Priority Data

Jan. 14, 2022 (CA) ................................ CA 3145602

(51) Int. Cl.
*B26D 3/18* (2006.01)
*B26D 7/01* (2006.01)

(52) U.S. Cl.
CPC ................ *B26D 3/18* (2013.01); *B26D 7/01* (2013.01)

(58) Field of Classification Search
CPC .................................... B26D 3/18; B26D 7/01
See application file for complete search history.

(56) References Cited

U.S. PATENT DOCUMENTS

| | | | | | |
|---|---|---|---|---|---|
| 2,611,406 | A * | 9/1952 | Preble, Jr. | B26D 7/00 | 83/717 |
| 2,855,166 | A * | 10/1958 | Green | B26D 1/143 | 248/678 |
| 3,002,543 | A * | 10/1961 | Weiner | B26D 1/15 | 83/437.1 |
| 3,595,115 | A * | 7/1971 | Pelletier | B23D 19/04 | 83/471 |
| 4,246,821 | A * | 1/1981 | Fuse | B26D 7/225 | 83/571 |
| 4,273,013 | A * | 6/1981 | Artin | B26D 7/225 | 83/167 |
| 4,307,843 | A * | 12/1981 | Loiseau | B26D 9/00 | 241/273.3 |

(Continued)

*Primary Examiner* — Evan H MacFarlane
*Assistant Examiner* — Fernando A Ayala
(74) *Attorney, Agent, or Firm* — Inskeep IP Group, Inc.

(57) ABSTRACT

The present disclosure concerns a manual food-slicing apparatus, comprising: a blade-supporting base; a cutting disk rotatably mounted to the blade-supporting base and comprising a plurality of cutting teeth disposed on an outer periphery thereof; and a food-guiding platform comprising a food-facing surface; wherein the food-guiding platform is pivotably mounted to the blade-supporting base to configure the food-slicing apparatus into a cutting configuration in which the food-facing surface of the food-guiding platform is substantially perpendicular to a cutting plane defined by the cutting teeth and a storage configuration in which the food-facing surface of the food-guiding platform is substantially parallel to the cutting plane. It also concerns a corresponding method.

16 Claims, 15 Drawing Sheets

(56) References Cited

U.S. PATENT DOCUMENTS

| | | | | | |
|---|---|---|---|---|---|
| 4,345,498 | A * | 8/1982 | Best | B26D 7/22 | 312/258 |
| 4,499,804 | A | 2/1985 | Takeda | | |
| 4,685,364 | A * | 8/1987 | Scheflow | B26D 7/12 | 83/68 |
| 4,760,766 | A * | 8/1988 | Short | B26D 7/0608 | 83/664 |
| 5,440,959 | A * | 8/1995 | Bindon | B26D 7/088 | 83/167 |
| 5,745,999 | A | 5/1998 | Zirkiev | | |
| 9,731,428 | B2 | 8/2017 | Levine et al. | | |
| D926,516 | S * | 8/2021 | Deng | D7/381 | |
| 2002/0157512 | A1* | 10/2002 | Fasske | B25H 3/006 | 83/639.1 |
| 2006/0283299 | A1* | 12/2006 | Mellen | B26D 7/00 | 83/401 |
| 2017/0190067 | A1* | 7/2017 | Wilhelm | B26D 1/14 | |
| 2019/0335954 | A1* | 11/2019 | Chen | B26D 7/00 | |

* cited by examiner

FOLDABLE MANUAL FOOD-SLICING APPARATUS AND CORRESPONDING METHOD

RELATED APPLICATIONS

This application claims benefit of and priority to Canadian Patent Application No. 3 145 602 filed Jan. 14, 2022 entitled FOLDABLE MANUAL FOOD-SLICING APPARATUS AND CORRESPONDING METHOD, which is hereby incorporated herein by reference in its entirety.

TECHNICAL FIELD

The instant invention relates generally to kitchen utensils and more specifically to food-slicing apparatuses.

BACKGROUND OF THE INVENTION

Various devices are available for cutting food items into different shapes. For example, there are food slicers that can receive food items and, upon displacement of the food item, cause the food item to be cut into a number of different pieces or strands. However, many of the available devices have various shortcomings. For example, conventional devices can be difficult to use, clean, and/or replace parts. In addition, many devices are limited in the manner in which they can cut food items and altering those devices to change the type of cutting provided can be difficult or time consuming. Moreover, the devices might be cumbersome. Accordingly, an improved food-slicing apparatus is desirable.

In view of the above, there is a need for a manual food-slicing apparatus which would be able to overcome or at least minimize some of the above-discussed prior art concerns, and for a corresponding method.

BRIEF SUMMARY

It is therefore an aim of the present invention to address the above-mentioned issues.

According to a general aspect, there is provided a manual food-slicing apparatus, comprising: a blade-supporting base; a cutting disk rotatably mounted to the blade-supporting base and comprising a plurality of cutting teeth disposed on an outer periphery thereof; and a food-guiding platform comprising a food-facing surface; wherein the food-guiding platform is pivotably mounted to the blade-supporting base to configure the food-slicing apparatus into a cutting configuration in which the food-facing surface of the food-guiding platform is substantially perpendicular to a cutting plane defined by the cutting teeth and a storage configuration in which the food-facing surface of the food-guiding platform is substantially parallel to the cutting plane.

According to another general aspect, there is provided a manual food-slicing apparatus, comprising: a blade-supporting base; a cutting blade rotatably mounted to the blade-supporting base about a rotation axis and comprising a plurality of cutting teeth disposed on an outer periphery thereof; and a food-guiding platform comprising a food-facing surface; wherein the food-guiding platform is pivotably mounted to the blade-supporting base to configure the food-slicing apparatus into a cutting configuration in which the food-slicing apparatus has an operating length considered along the rotation axis, and into a storage configuration in which the food-slicing apparatus has a storage length considered along the rotation axis, the storage length being smaller than 60% of the operating length.

According to another general aspect, there is provided a method for manually slicing a piece of food, the method comprising: providing a manual food-slicing apparatus comprising: a blade-supporting base; a cutting disk rotatably mounted to the blade-supporting base about a rotation axis and comprising a plurality of cutting teeth disposed on an outer periphery thereof; a turning handle mounted to the blade-supporting base and operatively coupled to the cutting disk; and a food-guiding platform pivotally mounted to the blade-supporting base and comprising a food-facing surface; pivoting the food-guiding platform in a food-guiding configuration wherein the food-facing surface is substantially perpendicular to a cutting plane defined by the cutting disk; pushing a piece of food towards the cutting teeth of the cutting disk; and actuating the turning handle to rotate the cutting disk.

SUMMARY OF THE INVENTION

Figure 1:
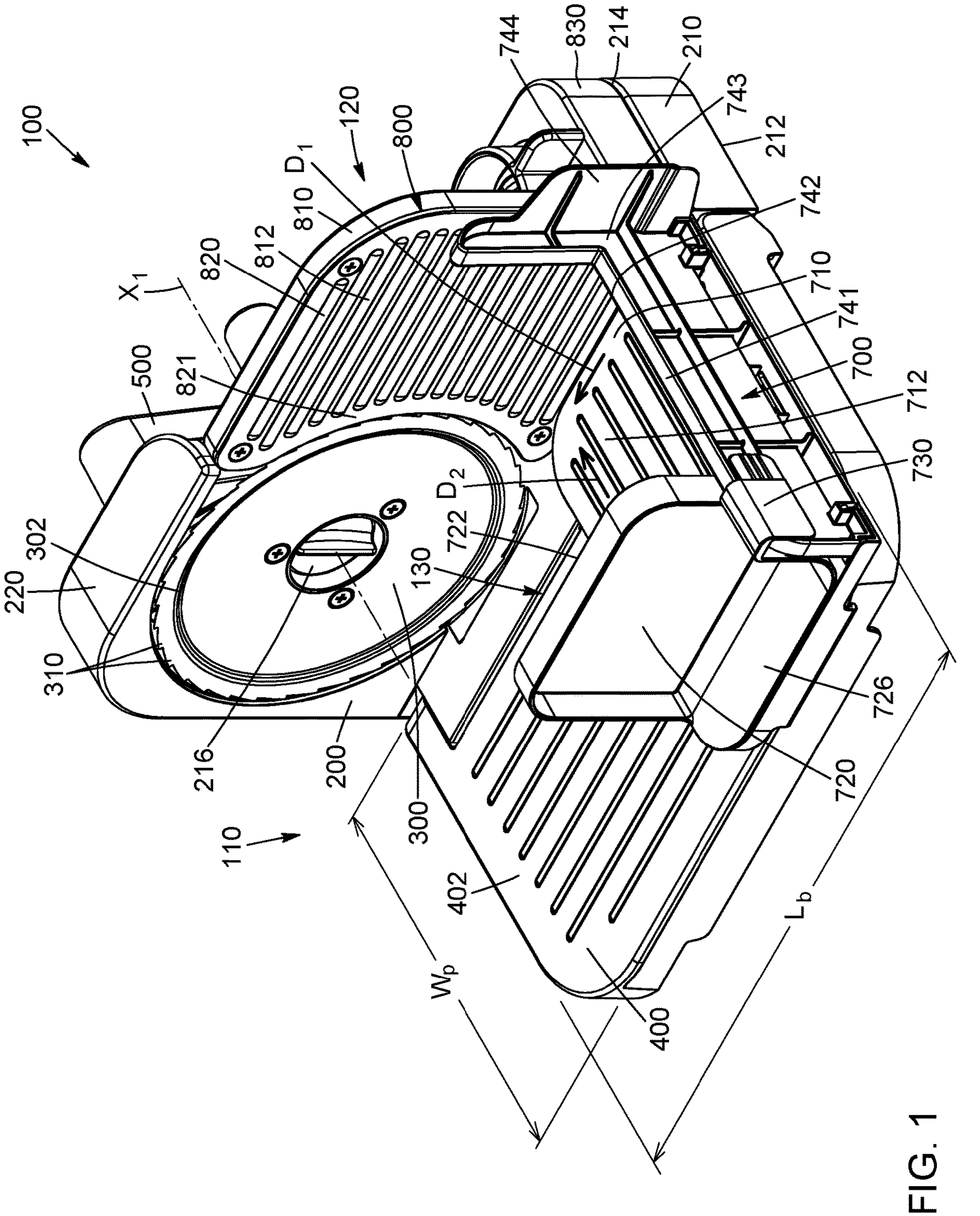
FIG. 1 is a top upstream perspective view of a manual food-slicing apparatus in accordance with an embodiment, the food-slicing apparatus being configured in a cutting configuration.

In the following description, the same numerical references refer to similar elements. Furthermore, for the sake of simplicity and clarity, namely so as to not unduly burden the figures with several references numbers, not all figures contain references to all the components and features, and references to some components and features may be found in only one figure, and components and features of the present disclosure which are illustrated in other figures can be easily inferred therefrom. The embodiments, geometrical configurations, materials mentioned and/or dimensions shown in the figures are optional, and are given for exemplification purposes only.

Moreover, it will be appreciated that positional descriptions such as "above", "below", "forward", "rearward", "left", "right" and the like should, unless otherwise indicated, be taken in the context of the figures only and should not be considered limiting. Moreover, the figures are meant to be illustrative of certain characteristics of the foldable food-slicing apparatus and are not necessarily to scale.

To provide a more concise description, some of the quantitative expressions given herein may be qualified with the term "about". It is understood that whether the term "about" is used explicitly or not, every quantity given herein is meant to refer to an actual given value, and it is also meant to refer to the approximation to such given value that would reasonably be inferred based on the ordinary skill in the art, including approximations due to the experimental and/or measurement conditions for such given value.

In the following description, an embodiment is an example or implementation. The various appearances of "one embodiment", "an embodiment" or "some embodiments" do not necessarily all refer to the same embodiments. Although various features may be described in the context of a single embodiment, the features may also be provided separately or in any suitable combination. Conversely, although the invention may be described herein in the context of separate embodiments for clarity, it may also be implemented in a single embodiment. Reference in the specification to "some embodiments", "an embodiment", "one embodiment" or "other embodiments" means that a particular feature, structure, or characteristic described in connection with the embodiments is included in at least some embodiments, but not necessarily all embodiments.

It is to be understood that the phraseology and terminology employed herein is not to be construed as limiting and are for descriptive purpose only. The principles and uses of the teachings of the present disclosure may be better understood with reference to the accompanying description, figures and examples. It is to be understood that the details set forth herein do not construe a limitation to an application of the disclosure.

Furthermore, it is to be understood that the disclosure can be carried out or practiced in various ways and that the disclosure can be implemented in embodiments other than the ones outlined in the description above. It is to be understood that the terms "including", "comprising", and grammatical variants thereof do not preclude the addition of one or more components, features, steps, or integers or groups thereof and that the terms are to be construed as specifying components, features, steps or integers. If the specification or claims refer to "an additional" element, that does not preclude there being more than one of the additional element. It is to be understood that where the claims or specification refer to "a" or "an" element, such reference is not to be construed that there is only one of that element. It is to be understood that where the specification states that a component, feature, structure, or characteristic "may", "might", "can" or "could" be included, that particular component, feature, structure, or characteristic is not required to be included.

The descriptions, examples, methods and materials presented in the claims and the specification are not to be construed as limiting but rather as illustrative only. Meanings of technical and scientific terms used herein are to be commonly understood as by one of ordinary skill in the art to which the invention belongs, unless otherwise defined. It will be appreciated that the methods described herein may be performed in the described order, or in any suitable order.

Figure 2:
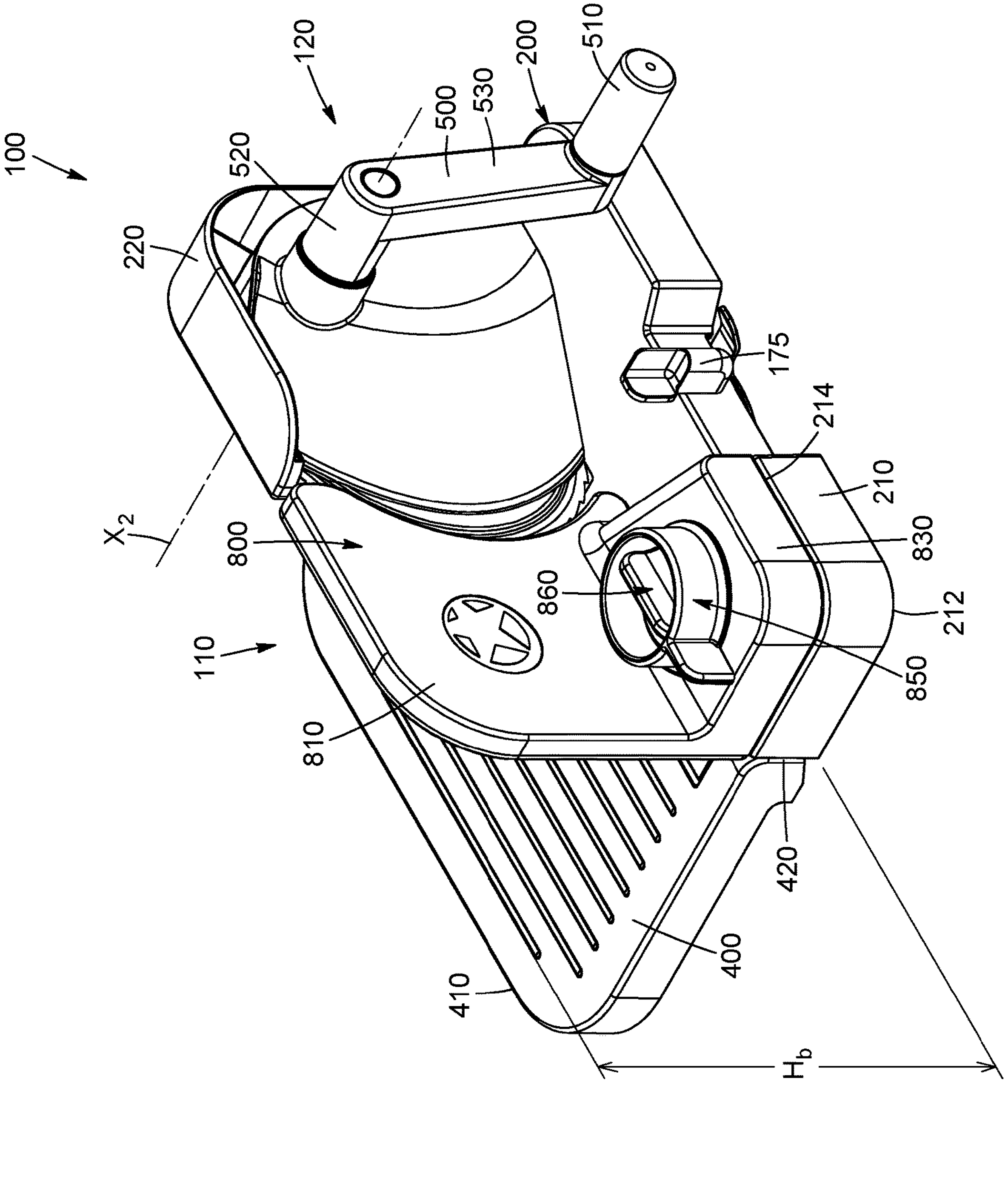
FIG. 2 is a top downstream perspective view of the food-slicing apparatus of FIG. 1, with no food-pushing assembly.

Referring now to the drawings, and more particularly to FIGS. 1 and 2, there is shown a foldable manual food-slicing apparatus 100 that is configurable into at least a cutting configuration, wherein a food item or piece of food can be sliced into a plurality of pieces or slices by the manual food-slicing apparatus 100, and into a storage configuration, when not in use.

Foldable Manual Food-Slicing Apparatus

In the embodiment shown, the foldable manual food-slicing apparatus 100 comprises a blade-supporting base 200; a cutting disk 300 (or cutting blade) rotatably mounted to the blade-supporting base and comprising a plurality of cutting teeth 310 disposed on an outer periphery 302 thereof; and a food-guiding platform 400 mounted to the blade-supporting base 200 and comprising a food-facing surface 402. The cutting teeth 310 define a cutting plane.

In the embodiment shown, the food-guiding platform 400 is pivotably mounted to the blade-supporting base 200 to configure the food-slicing apparatus 100 into the cutting configuration (FIG. 1) in which the food-facing surface 402 of the food-guiding platform 400 is substantially perpendicular to the cutting plane defined by the cutting teeth of the cutting disk 300 and the storage configuration (FIG. 8) in which the food-facing surface 402 of the food-guiding platform 400 is substantially parallel to the cutting plane defined by the cutting disk 300.

Figure 4:
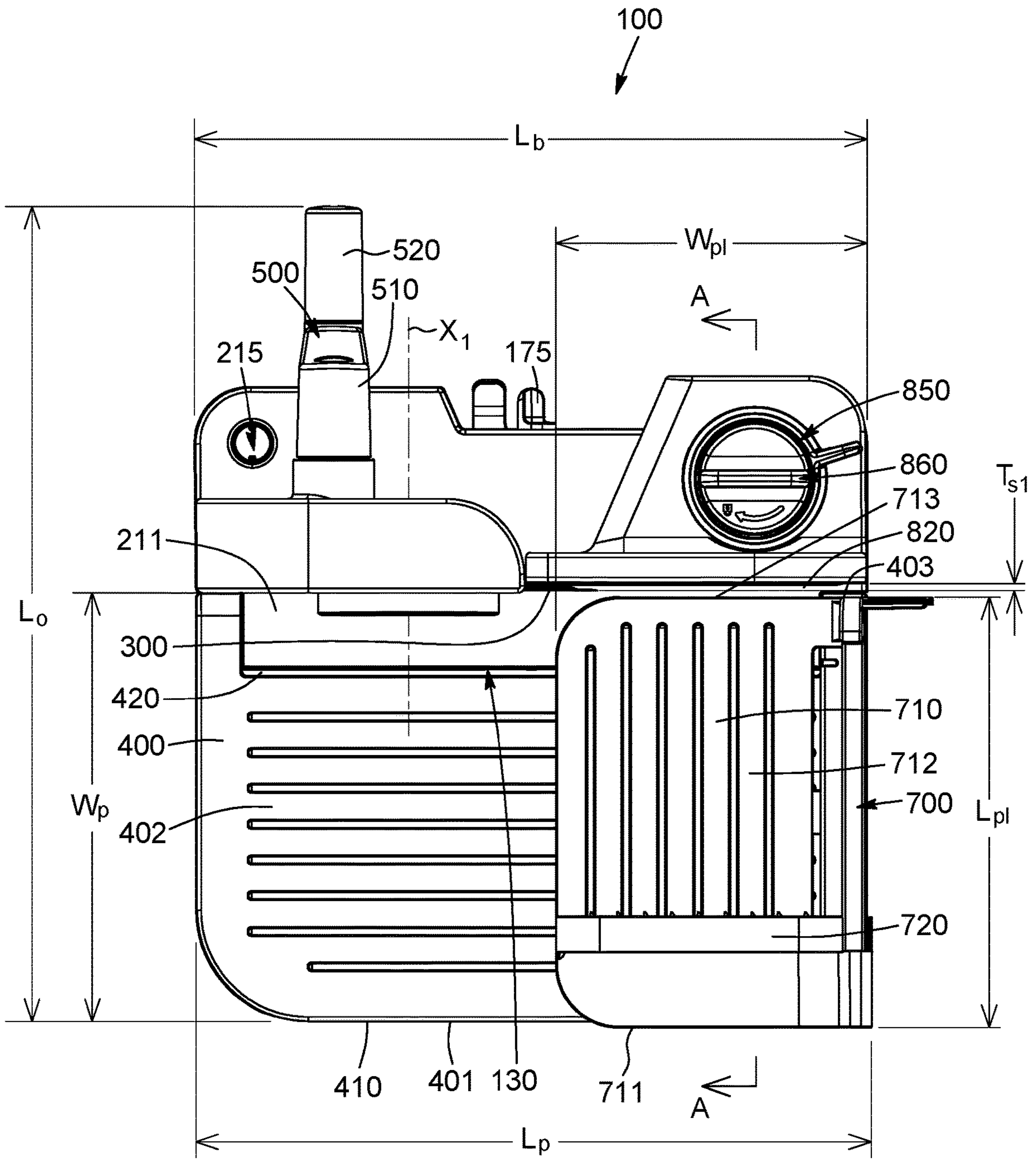
FIG. 4 is a top elevational view of the food-slicing apparatus of FIG. 1, the food-slicing apparatus comprises a cutting blade defining a cutting plane and a gauge plate defining a first slicing thickness therewith.
Figure 10:
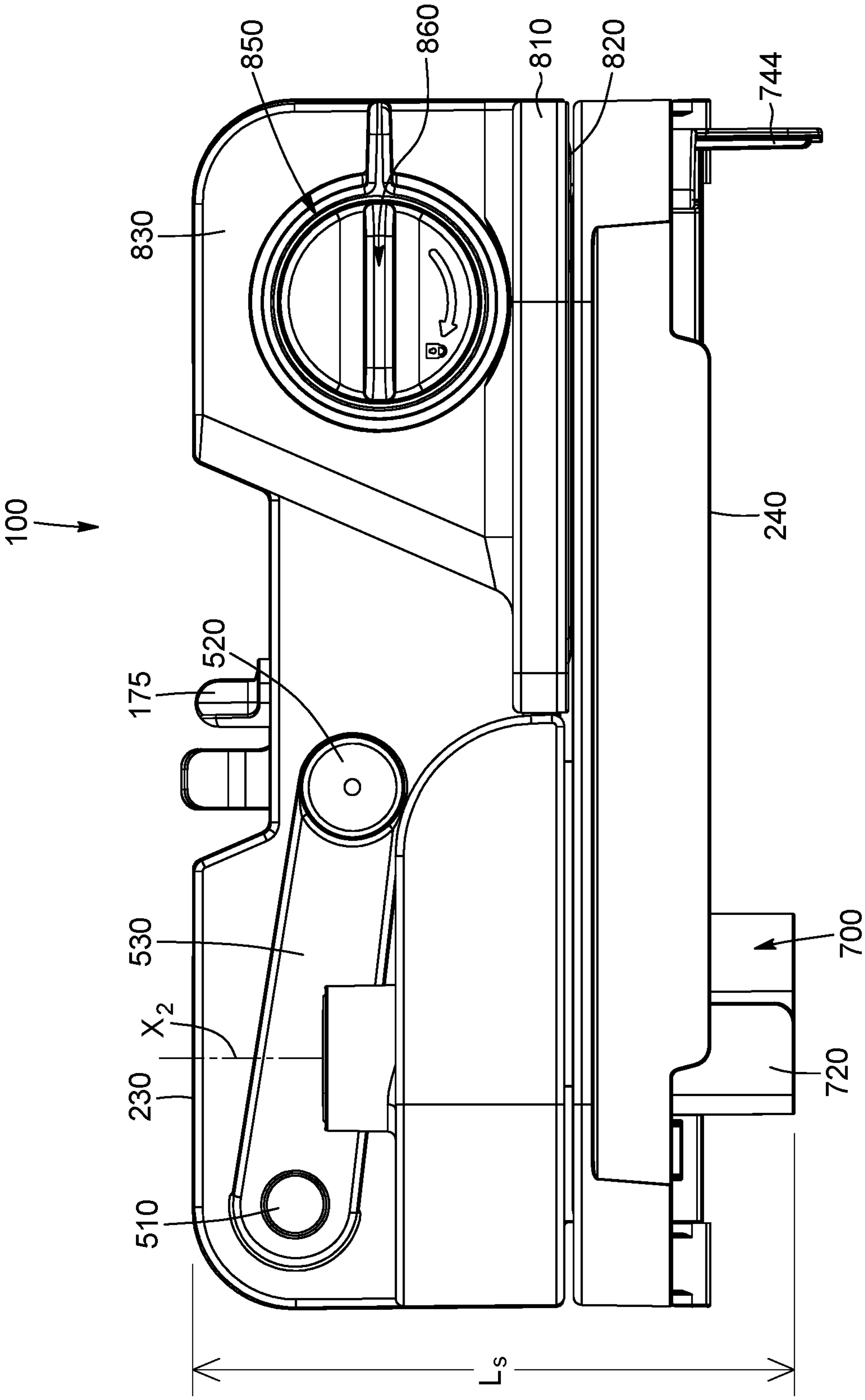
FIG. 10 is a top elevational view of the food-slicing apparatus of FIG. 8.

In other words, in the embodiment shown, the cutting disk 300 is rotatably mounted to the blade-supporting base about a rotation axis X1. In the cutting configuration, the manual food-slicing apparatus 100 has an operating length Lo considered along the rotation axis X1, as best shown in FIG. 4, and in the storage configuration, the manual food-slicing apparatus 100 has a storage length Ls considered along the rotation axis X1, as best shown in FIG. 10. For instance, the storage length Ls is smaller than about 60% of the operating length Lo. In some other embodiments, the storage length Ls is smaller than about 50% of the operating length Lo. In some other embodiments, the storage length Ls is smaller than about 45% of the operating length Lo. In some other embodiments, the storage length Ls is smaller than about 40% of the operating length Lo. In yet some other embodiments, the storage length Ls is smaller than about 35% of the operating length Lo.

The cutting plane is transversal, for instance substantially perpendicular, to the rotation axis X1.

For instance, the manual food-slicing apparatus 100 is shaped and dimensioned to slice bread, cheese, fruits, vegetables and the like. For instance, the food-slicing apparatus 100 is at least partially made of plastics and/or steel (for instance stainless steel).

As detailed below, when in use, a piece of food is arranged on the food-facing surface 402 of the food-guiding platform 400 and is displaced (for instance pushed) towards the rotating cutting disk 300 to slice or cut the piece of food into at least two portions (for instance to form one or more slices thereof). The slice of the piece of food is then collected on a side of the cutting disk 300 opposed to a side thereof facing the food-guiding platform 400. It is thus understood that the terms "upstream" and "downstream" used in the following description should be understood with respect to the cutting disk 300 (for instance with respect to the cutting plane defined by the cutting teeth thereof) which defines an upstream part 110 and a downstream part 120 thereof.

Blade-Supporting Base

In the embodiment shown, the blade-supporting base 200 comprises a base member 210 for instance substantially rectangular in shape and comprising a counter-facing surface 212 (or lower surface 212) to at least partially support the food-slicing apparatus 100 on a surface such as a counter or a kitchen countertop. The base member 210 comprises an upper surface 214 opposed to the counter-facing surface 212.

The blade-supporting base 200 further comprises a gear-supporting wall 220 extending upwardly from the upper surface 214 of the base member 210. For instance, the gear-supporting wall 220 extends transversally (for instance substantially perpendicular) to the upper surface 214 of the base member 210. As detailed below, the cutting disk 300 is rotatably mounted (for instance in a removable manner) to the gear-supporting wall 220. It is thus understood that the gear-supporting wall 220 extends substantially between the upstream and downstream parts 110, 120 of the food-slicing apparatus 100.

It is appreciated that the shape, the configuration, and the location of the blade-supporting base, as well as the shape, the configuration and the relative arrangement of the base member and the gear-supporting wall thereof can vary from the embodiment shown.

Cutting Disk

In the embodiment shown, the cutting disk 300 (or cutting blade 300) has a substantially planar disk body 320 delimitated peripherally by the outer periphery 302. In the embodiment shown, the cutting disk 300 is a member designed to be rotatably mounted on a spindle 216 of the food-slicing apparatus 100 (for instance of the blade-supporting base 200 thereof, for instance of the gear-supporting wall 220 thereof).

A spindle-receiving opening 322, which defines a rotation of the cutting disk 300, is formed in a central portion of the disk body 320 to rotatably mount the cutting disk 300 to the blade-supporting base 200. It is to be noted that the terms "outer" and "outwardly", relative to the outer periphery, should be understood with opposition to the central portion of the disk body 320 through which the spindle-receiving opening 322 is formed.

A plurality of peripherally (or circumferentially if the disk body 320 is substantially circular in shape as in the embodiment shown) interspaced cutting teeth 310 are disposed on the outer periphery 302 of the disk body 320 and which, at least the embodiment shown, protrude generally radially outward from the outer periphery 302 and therefore also from the rotation axis X1 of the cutting disk 300 when mounted to the blade-supporting base 200. In the embodiment shown, the cutting teeth 310 are shaped and dimensioned to cut different types of food items and to define together the above-mentioned cutting plane.

In the embodiment shown, the rotation axis X1 is substantially parallel to the upper surface 214 of the blade-supporting base 200 when mounted thereto. In other words, the rotation axis X1 is substantially horizontal when the blade-supporting base 200 (for instance the base member 210 thereof) is supported on a substantially horizontal plane.

In the embodiment shown, the cutting disk 300 is at least partially made of steel (for instance stainless steel or any other easily cleanable material).

Figure 3:
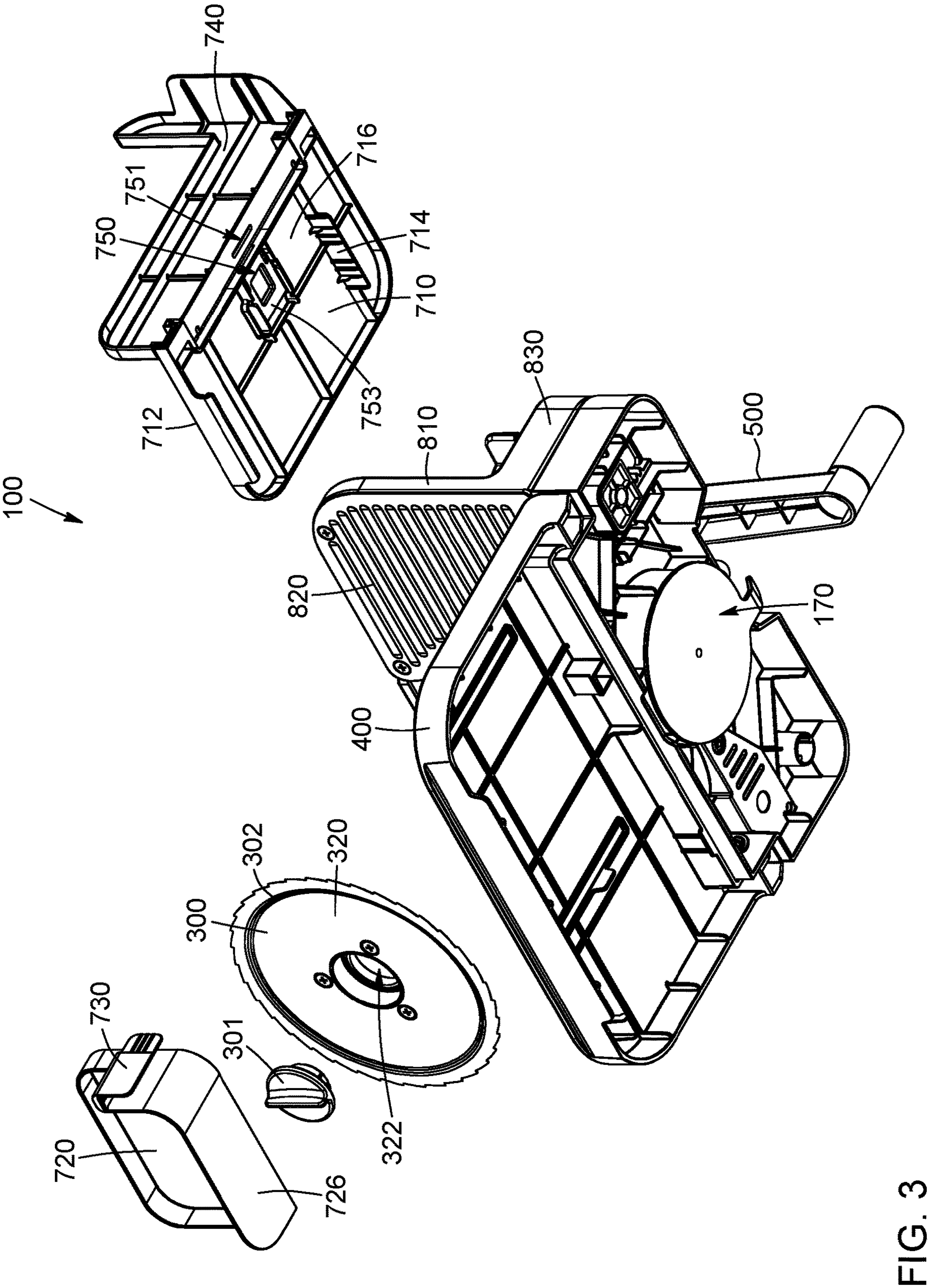
FIG. 3 is a bottom perspective view, partially exploded, of the food-slicing apparatus of FIG. 1.

In the embodiment shown, the cutting disk 300 is removably mounted to the blade-supporting base 210 (for instance to the gear-supporting wall 220 thereof, for instance via a blade-securing knob 301—FIG. 3) so as to be easily cleaned and replaced, if needed. It could for instance be conceived a food-slicing kit comprising the food-slicing apparatus 100 and a plurality of removable cutting disks with cutting teeth of different shapes and/or dimensions and/or materials, so as to adapt the food-slicing apparatus to the piece of food being cut.

It is appreciated that the shape, the configuration, and the location of the cutting disk can vary from the embodiment shown.

Hand Crank

In the embodiment shown, the food-slicing apparatus 100 further comprises a hand crank 500 (or turning handle 500) rotatably mounted (for instance removably) to the blade-supporting base 200 about a crank axis X2 (for instance to the gear-supporting wall 220 thereof). For instance, the crank axis X2 is substantially parallel to the rotation axis X1 (for instance substantially perpendicular to the cutting plane). The hand crank 500 is operatively couplable via a gear assembly 600 (FIG. 11) to the cutting disk 300 to rotate the cutting disk 300 about the rotation axis X1. In other words, the hand crank 500 is shaped and dimensioned to manually actuate the food-slicing apparatus 100.

Figure 11:
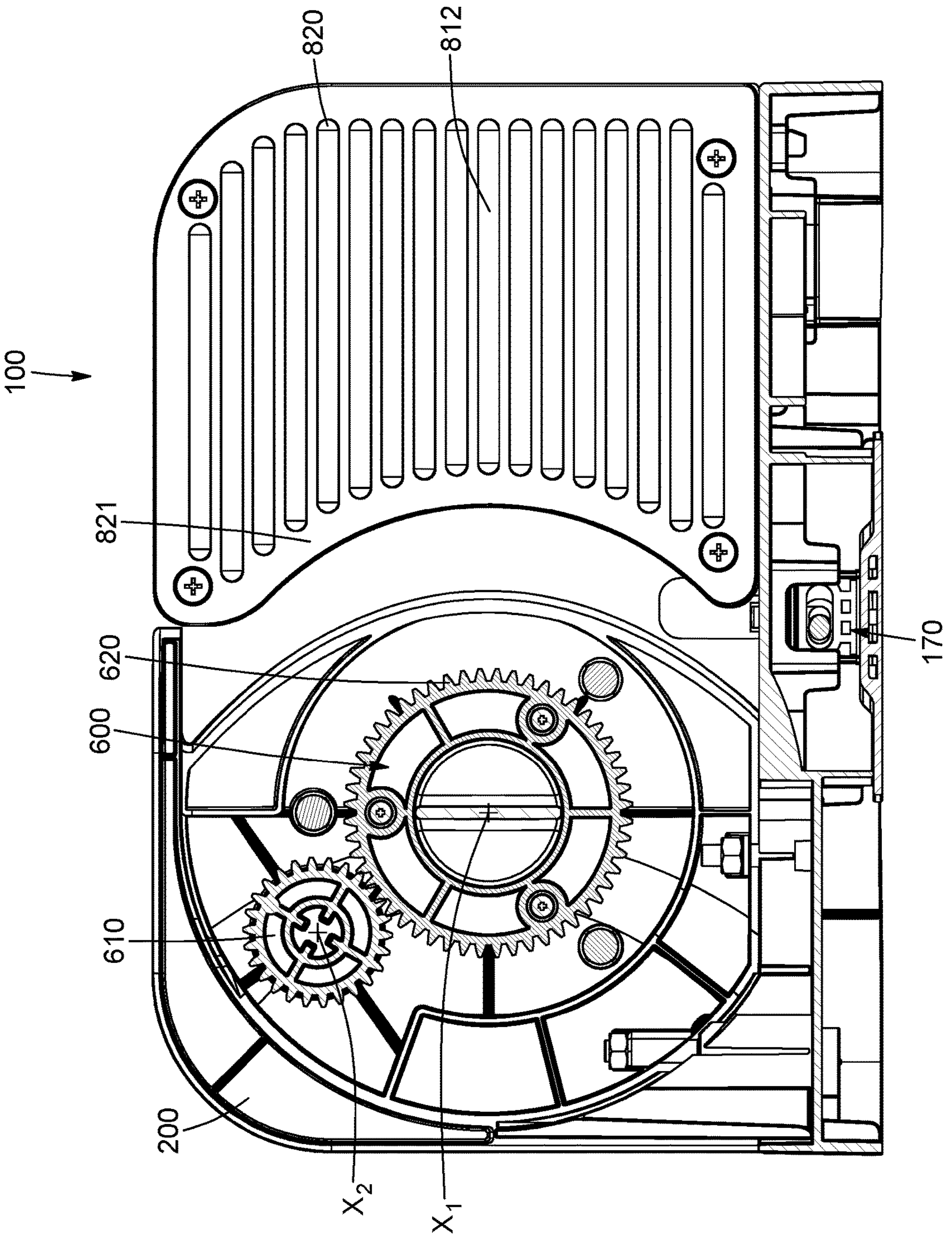
FIG. 11 is a cross-sectional view of the food-slicing apparatus of FIG. 5, taken along cross-section lines C-C thereof.

As best shown in FIG. 11, in the embodiment shown, the gear assembly 600 comprises a drive gear 610 operatively couplable to the hand crank 500, and a driven gear 620 mounted to or formed integral with the cutting disk 300 (in the embodiment shown, mounted to the disk body 320 thereof, surrounding the spindle-receiving opening 322).

In the embodiment shown, the drive and driven gears 610, 620 are interlocked with each other. For instance, the drive gear 610 has a number of teeth smaller than the driven gear 620 so that the cutting disk 300 will rotate about the rotation axis X1 less quickly than the hand crank 500 rotating about the crank axis X2. In the embodiment shown, the gear ratio of the gear assembly 600 is smaller than 1. In some embodiments, the gear ratio is smaller than about 0.9. In some other embodiments, the gear ratio is smaller than about 0.5. In yet some other embodiments, the gear ratio is smaller than about 0.25.

The gear assembly 600 is thus shaped and dimensioned to limit the risk of tearing apart the food item and/or injuring the user.

It is thus understood that the gear assembly 600 is shaped and dimensioned to operatively couple the turning handle 500 (or hand crank 500) to the cutting blade 300 (or cutting disk 300) when the cutting disk 300 and the hand crank 500 are both mounted to the blade-supporting base 200.

In the embodiment shown, the hand crank 500 comprises a gripping portion 510, a gear-engaging portion 520 and a crank arm 530 extending between the gripping portion 510 and the gear-engaging portion 520. The handle or gripping portion 510 is shaped and dimensioned to be grasped by a user to impart the rotating motion of the cutting disk 300. It is thus understood that the hand crank 500 can be rotated about the crank axis X2, causing the cutting disk 300 to rotate about the rotation axis X1.

For instance, the gripping portion 510 and/or the gear-engaging portion 520 extend substantially parallel to the crank axis X2 when the hand crank 500 is mounted to the blade-supporting base 200. For instance, the crank arm 530 extends substantially perpendicular to the crank axis X2 (for instance substantially parallel to the cutting plane) when the hand crank 500 is mounted to the blade-supporting base 200 (for instance to the gear-supporting wall 220).

In the embodiment shown, the hand crank 500 is configurable into an actuating configuration (corresponding to the cutting configuration of the food-slicing apparatus 100) wherein the hand crank 500 is mounted to the blade-supporting base 200 to rotate the cutting disk 300 about the rotation axis X1 upon rotation of the hand crank 500 about the crank axis X2. In the actuating configuration, the gear-engaging portion 520 extends substantially parallel to the rotation axis X1.

Figure 6:
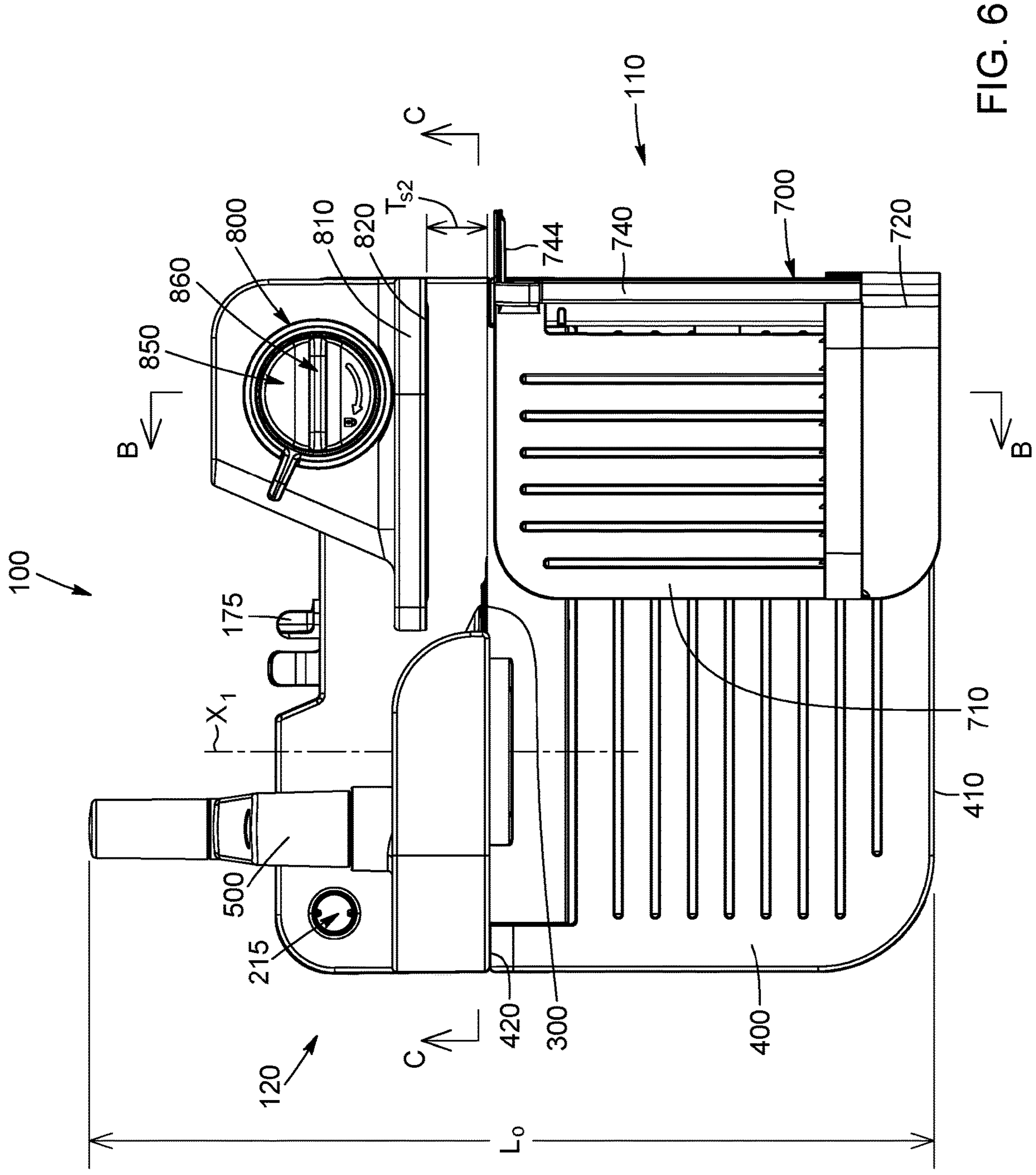
FIG. 6 is a top elevational view of the food-slicing apparatus of FIG. 1, the cutting blade and the gauge plate defining a second slicing thickness greater than the first slicing thickness.

As best shown in FIGS. 4 and 6, the operating length Lo of the food-slicing apparatus 100 is defined between the gripping portion 510 (for instance a distal end portion thereof) of the hand crank 500 and a distal edge 410 (opposed to a base-mounting edge 420) of the food-guiding platform 400.

For instance, in the embodiment shown, the hand crank 500 is rotated in a counter-clockwise direction about the crank axis X2 when considered from the downstream side 120 of the food-slicing apparatus 100 to rotate the cutting disk 300 in a counter-clockwise direction about the rotation axis X1 when considered from the upstream side 110 of the food-slicing apparatus 100. It should be understood that, at least in some embodiments, the gear assembly 600, the hand crank 500 and the cutting disk 300 could be designed for the cutting disk and/or the hand crank to be rotated in a clockwise direction when considered from the corresponding side of the food-slicing apparatus.

Figure 9:
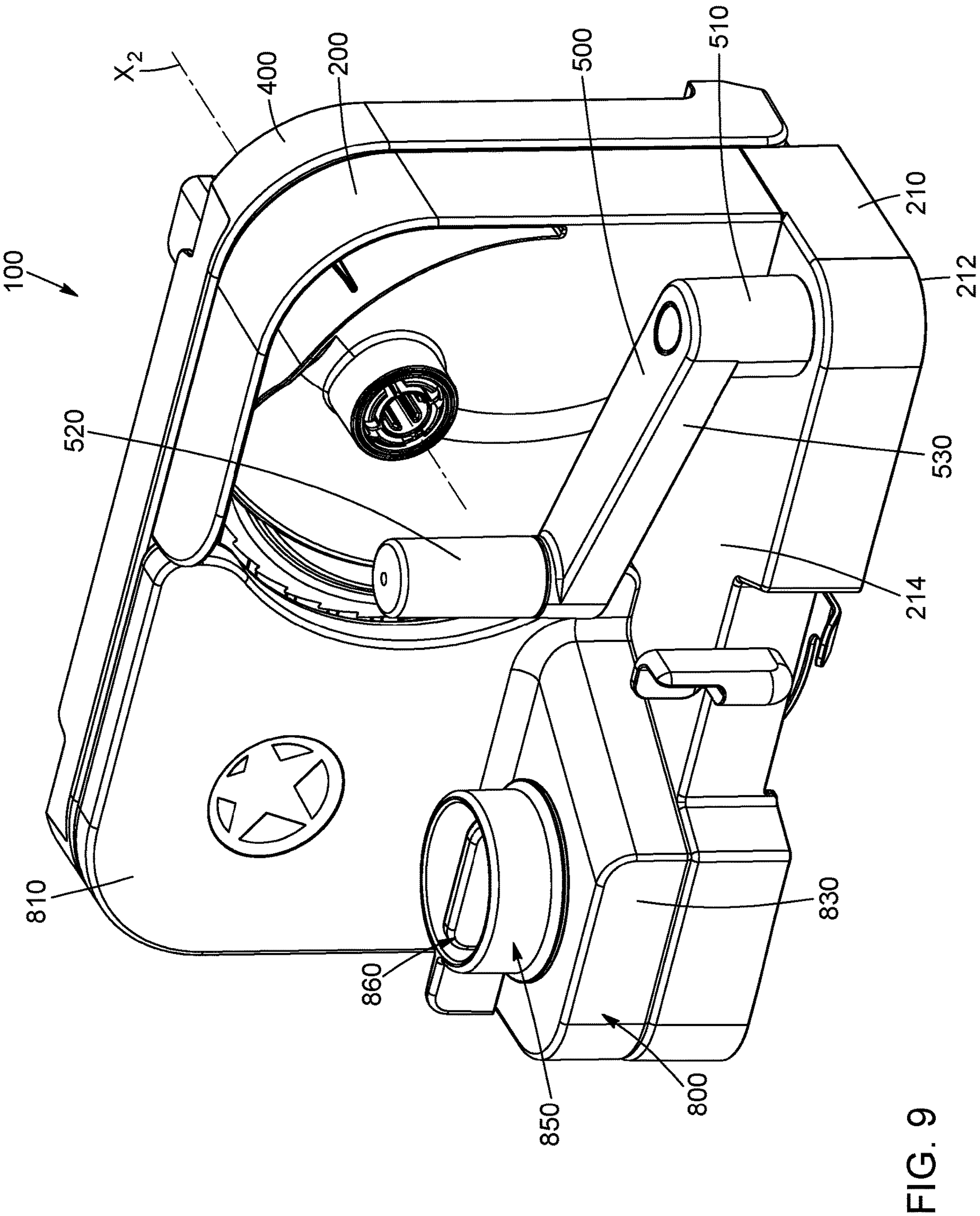
FIG. 9 is a top downstream perspective view of the food-slicing apparatus of FIG. 8.

In the embodiment shown, the hand crank 500 is removably mounted to the blade-supporting base 200 so that the hand crank 500 is further configurable into a storage configuration, as best shown in FIGS. 9 and 10 (corresponding to the storage configuration of the food-slicing apparatus 100). When configured in the storage configuration, the gripping portion 510 and/or the gear-engaging portion 520 extend upwardly from the upper surface 214 of the base member 210 of the blade-supporting base 200. In the embodiment shown, the gripping portion 510 and/or the gear-engaging portion 520 extend transversally from (for instance substantially perpendicular to) the upper surface 214 of the base member 210 of the blade-supporting base 200 when the hand crank 500 is configured in the storage configuration. For instance, the gear-engaging portion 520 is at least partially insertable into a crank-receiving aperture 251 formed in the upper surface 214 of the base member 210.

As best shown in FIG. 10, when configured in the storage configuration, the hand crank 500 is substantially contained within an outer perimeter of the base member 210. In other words, the hand crank 500 does not protrude from the blade-supporting base 200, when considered in a plane defined by the upper surface 214 of the blade-supporting base 200. Moreover, as best shown in FIG. 9, when configured in the storage configuration, the hand crank 500 is substantially contained within an outer perimeter of the gear-supporting wall 220. In other words, the hand crank 500 does not protrude from the blade-supporting base 200, when considered in a plane containing the cutting plane of the cutting disk 300 when mounted to the blade-supporting base 200.

It is thus understood, as best shown in FIG. 10, that the storage length Ls of the food-slicing apparatus 100 is defined between an upstream edge 240 of the blade-supporting base 200 (or a counter-facing surface 405 of the food-guiding platform 400, or portions of a food-pushing assembly 700 when mounted to the counter-facing surface 405 of the food-guiding platform 400, as detailed below) and a downstream edge 230 of the blade-supporting base 200. In other words, when configured in the storage configuration, a footprint of the food-slicing apparatus 100 substantially corresponds to a footprint of the blade-supporting base 200 (of the base member 210 thereof, in the embodiment shown).

It is appreciated that the shape, the configuration, and the location of the hand crank and the gear assembly, as well as the shape, the configuration and/or the gear ratio thereof can vary from the embodiment shown.

Food-Guiding Platform (or Working Platform)

In the embodiment shown, the food-guiding platform 400 is substantially rectangular in shape with a length Lp corresponding substantially to a length Lb of the blade-supporting base 200 (corresponding to a length of the base member 210 thereof) and a width Wp corresponding substantially to a height Hb of the blade-supporting base 200 (defined by heights of the base member and the gear-supporting wall thereof, in the embodiment shown).

In the embodiment shown, the food-guiding platform 400 is pivotally mounted to the blade-supporting base 200 (to the base member 210 thereof, in the embodiment shown) about a pivoting axis X3 (FIG. 8) substantially parallel to the upper surface 214 of the base member 210. In the embodiment shown, the pivoting axis X3 is close to (and substantially parallel to) the base-mounting edge 420 of the food-guiding platform 400. In the embodiment shown, the base member 210 of the blade-supporting base 200 comprises a shaft-receiving portion 211 (FIG. 4) protruding towards the upstream part 110, wherein the food-guiding platform 400 is pivotally mounted to the shaft-receiving portion 211 about the platform pivoting axis X3.

For instance, the platform pivoting axis X3 is substantially perpendicular to a vertical plane comprising the rotation axis X1 of the cutting disk 300 and/or the crank axis X2. For instance, the platform pivoting axis X3 is substantially parallel to a longitudinal direction L of the blade-supporting base 200. For instance, the platform pivoting axis X3 is substantially parallel to the cutting plane.

The pivoting food-guiding platform 400 is configurable into a food-guiding configuration as best shown in FIGS. 1 and 2, when the food-slicing apparatus 100 is in the cutting configuration (i.e. when in use).

In the embodiment shown, the food-facing surface 402 is substantially corrugated (i.e., a plurality of corrugations are formed thereon which extend, in the embodiment shown, along the length Lp of the food-guiding platform 400), in order to ease the guiding of the food item towards the cutting disk 300. For instance, the food-facing surface 402 of the pivoting food-guiding platform 400 is substantially parallel to the counter-facing surface 212 of the blade-supporting base 200 when in use.

As mentioned above, the food-guiding platform 400 is pivotable into a storage configuration (corresponding to the storage configuration of the food-slicing apparatus 100), wherein the food-facing surface 402 of the pivoting food-guiding platform 400 is transversal to (for instance substantially perpendicular to) the counter-facing surface 212 of the blade-supporting base 200.

Figure 8:
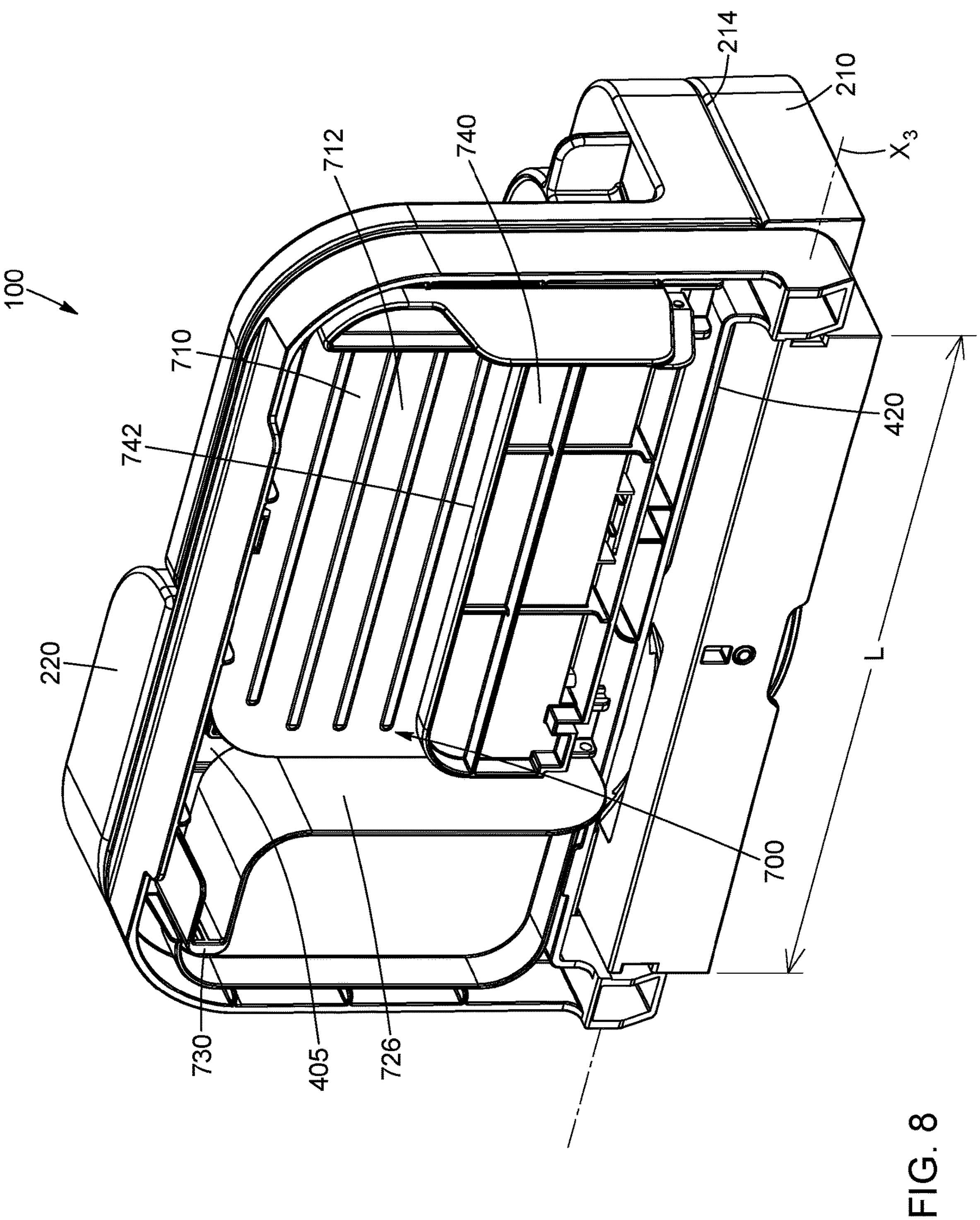
FIG. 8 is a top upstream perspective view of the food-slicing apparatus of FIG. 1, the food-slicing apparatus being configured in a storage configuration.

When configured in the storage configuration, as best shown in FIG. 8, an outer periphery of the food-guiding platform 400 (comprising the distal edge 410 thereof) is substantially in register with an outer periphery of the blade-supporting base 200 (for instance an upper edge of the gear-supporting wall 220 thereof), considered in a plane substantially perpendicular to the upper surface 214 of the base member 210 (i.e., in a plane substantially parallel to the cutting plane).

When configured in the storage configuration, as best shown in FIGS. 8 to 10, the cutting disk 300 is sandwiched between the blade-supporting base 200 (the gear-supporting wall 220 thereof) and the food-guiding platform 400 (the food-facing surface 402 thereof) so that the cutting disk 300 is not reachable from an outside of the food-slicing apparatus 100.

As best shown in FIG. 1, a guiding slot 130 is formed at or in the vicinity of a junction of the blade-supporting base 200 (of the base member 210 thereof in the embodiment shown) and the food-guiding platform 400.

As best shown in FIG. 4, the base-mounting edge 420 of the food-guiding platform 400 is shaped and dimensioned to follow substantially a shape of the shaft-receiving portion 211 of the base member 210 of the blade-supporting base 200. In the embodiment shown, the base-mounting edge 420 has thus a substantially U-shaped outer profile.

It is appreciated that the shape, the configuration, and the location of the food-guiding platform 400 can vary from the embodiment shown.

Food-Pushing Assembly

In the embodiment shown, the food-slicing apparatus 100 further comprises a food-pushing assembly 700 slidable along at least a portion of the food-facing surface 402 of the pivoting food-guiding platform 400 when configured in the food-guiding configuration (i.e., when the food-slicing apparatus 100 is configured in the cutting configuration).

As detailed below, the food-pushing assembly 700 is shaped and dimensioned to engage the piece of food and push it towards the cutting disk 300, so as to ease the slicing thereof.

In the embodiment shown, the food-pushing assembly 700 comprises a food-supporting plate 710 slidable along at least a portion of the food-facing surface 402 of the pivoting food-guiding platform 400. The food-pushing assembly 700 further comprises a food-engaging wall 720 extending upwardly (substantially transversally, from instance substantially perpendicularly) from a food-supporting surface 712 of the food-supporting plate 710. For instance, the food-engaging wall 720 is slidable along at least a portion of the food-supporting surface 712 of the food-supporting plate 710.

It is thus understood that, as represented in FIG. 1, a piece of food engaged with the food-pushing assembly 700 (for instance supported by the food-supporting surface 712 of the food-supporting plate 710) is displaceable towards the cutting blade 300 along first and second directions D1, D2. The first direction D1 is substantially parallel to the length Lb of the blade-supporting base 200 (corresponding to the length of the base member 210 thereof). The second direction D2 is substantially parallel to the length of the food-slicing apparatus 100 (or to the width Wp of the food-guiding platform 400). In the embodiment shown, the first and second directions D1, D2 are substantially perpendicular to each other.

In the embodiment shown, the food-pushing assembly 700 (for instance the food-supporting plate thereof 710) is at least partially insertable in the guiding slot 130 formed at the junction or in the vicinity of the blade-supporting base 200 (of the base member 210 thereof in the embodiment shown) and the pivoting food-guiding platform 400. For instance, as best shown in FIG. 3, the food-supporting plate 710 has a guiding rib 714 extending from a platform-facing surface 716 thereof (i.e., a surface opposed to the food-supporting surface 712), the guiding rib 714 being at least partially insertable into the guiding slot 130 so as to guide the displacement of the food-supporting plate 710 along the pivoting food-guiding platform 400 in the above-mentioned first direction D1.

In the embodiment shown, a length Lpl of the food-supporting plate 710 substantially corresponds to the width Wp of the food-guiding platform 400. In other words, when the food-pushing assembly 700 is configured into a food-pushing configuration wherein the food-pushing assembly 700 is slidable along at least a portion of the food-facing surface 402 of the food-guiding platform 400, as best shown in FIG. 4, first and second transversal edges 711, 713 of the food-supporting plate 710 are substantially in register with or in the vicinity of respectively first and second lateral edges 401, 403 (or distal and proximal lateral edges 401, 403, considered with respect to the base member 210 of the blade-supporting base 200) of the food-guiding platform 400 (considered along the width Wp thereof). In other words, the food-supporting plate 710 is shaped and dimensioned to extend along substantially an entirety of the width Wp of the food-guiding platform 400 when the food-pushing assembly 700 is configured in the food-pushing configuration.

In the embodiment shown, the food-supporting surface 712 of the food-supporting plate 710 is substantially corrugated (i.e., a plurality of corrugations are formed thereon which extend, in the embodiment shown, along the length Lpl of the food-supporting plate 710, i.e., substantially perpendicularly to the corrugations formed on the food-facing surface 402 of the pivoting food-guiding platform 400 when configured in the food-pushing configuration, i.e., substantially parallel to the above-mentioned second direction D2).

In the embodiment shown, the food-supporting plate 710 has a width Wpl smaller than the length Lp of the food-guiding platform 400. For instance, the width Wpl of the food-supporting plate 710 is smaller than about 80% of the length Lp of the food-pushing platform 400. For instance, the width Wpl of the food-supporting plate 710 is smaller than about 70% of the length Lp of the food-pushing platform 400. For instance, the width Wpl of the food-supporting plate 710 is smaller than about 60% of the length Lp of the food-pushing platform 400. For instance, the width Wpl of the food-supporting plate 710 is smaller than about 50% of the length Lp of the food-pushing platform 400.

Figure 12:
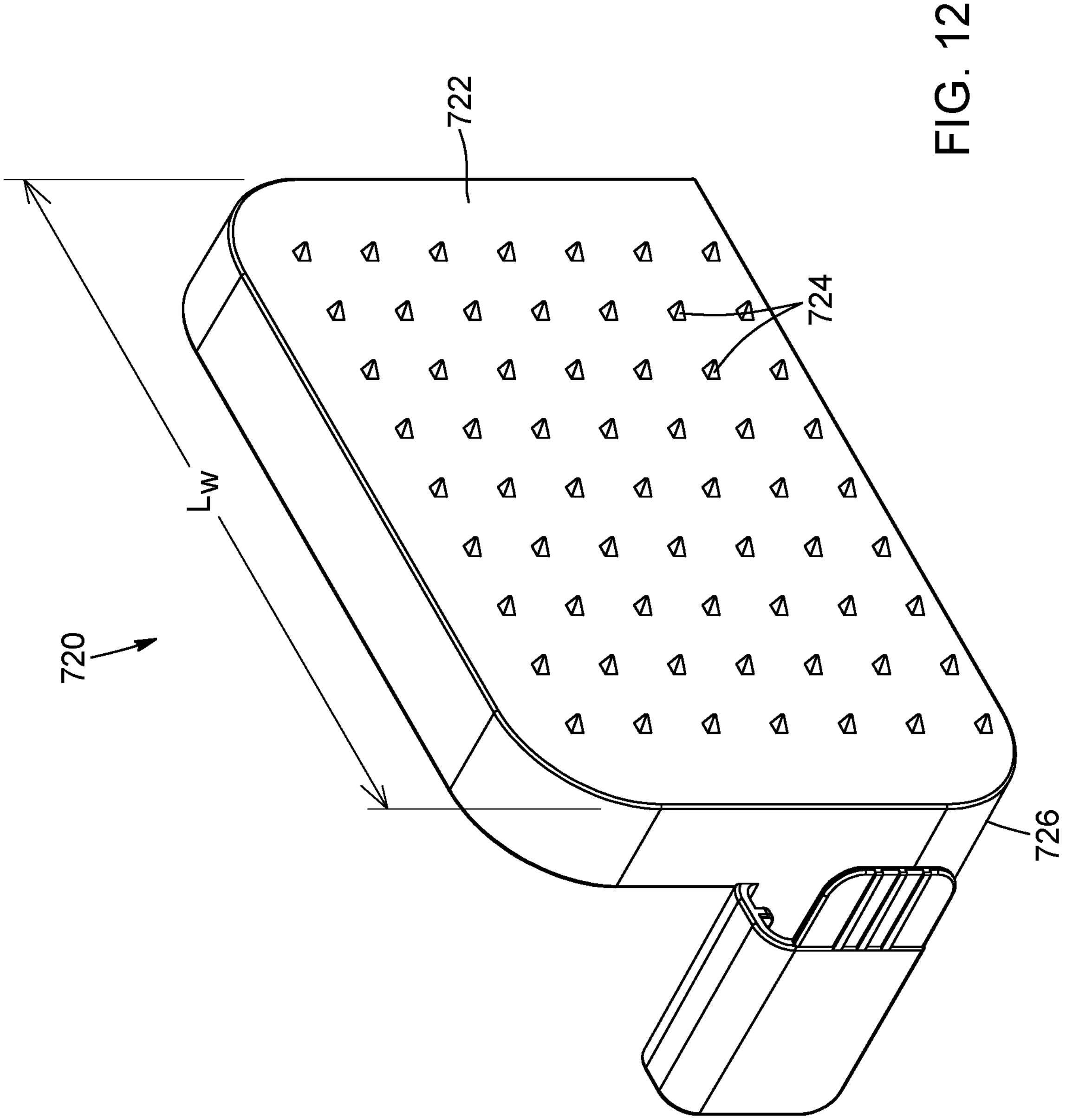
FIG. 12 is a top perspective view of a food-engaging wall of the food-pushing assembly in accordance with an embodiment.

In the embodiment shown, the food-engaging wall 720 (FIG. 12) has a food-engaging surface 722 (for instance substantially perpendicular to the food-supporting surface 712 of the food-supporting plate 710 when engaged therewith) with spikes 724 protruding therefrom towards the blade-supporting base 200 and the cutting disk 300. The food-engaging wall 720 also comprises a plate-sliding base 726 extending substantially perpendicularly to the food-engaging surface 722. In the embodiment shown, the food-engaging surface 722 is substantially rectangular and has a length Lw corresponding substantially to the width Wpl of the food-supporting plate 710.

In embodiment shown, the food-pushing assembly 700 further comprises a hand-protecting wall 740 mounted (for instance in a pivotable manner) to the food-supporting plate 710. The hand-protecting wall 740 is thus configurable into a hand-protecting configuration wherein the hand protecting wall 740 (or at least a food-facing surface 742 thereof) extends upwardly from the food-supporting surface 712 of the food-supporting plate 710 (for instance substantially perpendicularly) so as to limit the risk that a hand of a user contacts the cutting disk 300. In the embodiment shown, the hand-protecting wall 740 also comprises a thumb-protecting portion 744 extending from a hand-facing surface 743 (opposed to the food-facing surface 742) and shaped and dimensioned to be pushed upon by a thumb of a user when the food-pushing assembly 700 is in the food-pushing configuration and when the food-slicing apparatus 100 is in use.

The hand-protecting wall 740 is also pivotable into a storage configuration (FIG. 8) wherein the food-facing surface 742 is substantially superposed to the food-supporting surface 712 of the food-supporting plate 710, so as to limit dimensions of the food-pushing assembly 700 when the food-slicing apparatus is not in use.

In the embodiment shown, the food-pushing assembly 700 further comprises a locking assembly 750 (FIG. 3) configured to prevent the hand-protecting wall 740 from pivoting with respect to the food-supporting plate 710. For instance, the locking assembly 750 comprises a locking slot 751 formed in one of the hand-protecting wall 740 and the food-supporting plate 710 which is shaped and dimensioned to receive at least partially a mobile locking tab 753 mounted to the other one of the hand-protecting wall 740 and the food-supporting plate 710.

In the embodiment shown, the food-engaging wall 720 further comprises a plate connector 730 formed for instance at a junction of the food-engaging surface 722 and the plate-sliding base 726. The plate connector 730 is shaped and dimensioned to at least partially engage with a portion of the hand-protecting wall 740 and is slidable along an upper edge 741 of the hand-protecting wall so as to guide the sliding of the food-engaging wall 720 along the food-supporting plate 710.

As best shown in FIG. 8, when the food-slicing apparatus 100 is not in use, the food-pushing assembly 700 is configurable into a storage configuration wherein the food-pushing assembly 700 is mounted to the counter-facing surface 405 of the food-guiding platform 400. For instance, the food-engaging surface 722 of the food-engaging wall 720 engages a first portion of the counter-facing surface 405 of the food-guiding platform 400 and the platform-facing surface 716 of the food-supporting plate 710 engages a second portion of the counter-facing surface 405 of the food-guiding platform 400. When the food-pushing assembly 700 is in the storage configuration, at least about 50% of a surface area of the counter-facing surface 405 is covered by the food-pushing assembly 700. For instance, when the food-pushing assembly 700 is in the storage configuration, at least about 70% of the surface area of the counter-facing surface 405 is covered by the food-pushing assembly 700. For instance, when the food-pushing assembly 700 is in the storage configuration, at least about 80% of the surface area of the counter-facing surface 405 is covered by the food-pushing assembly 700. For instance, when the food-pushing assembly 700 is in the storage configuration, a substantial entirety of the surface area of the counter-facing surface 405 is covered by the food-pushing assembly 700.

It is appreciated that the shape, the configuration, and the location of the food-pushing assembly, as well as the shape, the configuration, the location and/or the number of the components thereof (i.e., of the food-supporting plate, the food-engaging wall and the hand-protecting wall) can vary from the embodiment shown.

Gauge Plate Assembly

In the embodiment shown, as represented for instance in FIG. 1, the food-slicing apparatus 100 further comprises a gauge plate assembly 800 comprising a gauge plate-supporting wall 810 extending upwardly from the base member 210 of the blade-supporting base 200 and a gauge base 830 mounted (for instance in a slidable manner, as detailed below) to the base member 210 of the blade-supporting base 200.

For instance, a gauge plate 820 is mounted to the gauge plate-supporting wall 810 and has a corrugated gauge surface 812 extending substantially parallel to and spaced apart from the cutting plane defined by the cutting teeth of the cutting disk 300 to define therewith a slicing thickness Ts. For instance, a plurality of corrugations extending substantially along the length Lb of the blade-supporting base 200 are formed in the gauge surface 812.

The gauge surface 812 is for instance at least partially made of steel (for instance stainless steel). For instance, the gauge surface 812 is shaped and dimensioned to at least partially surround the cutting disk 300. In other words, a concavity is formed in an outer edge 821 of the gauge plate 820 which substantially conforms to the outer periphery 302 of the cutting disk 300.

It is appreciated that the shape, the configuration, and the location of the gauge plate assembly, as well as the shape, the configuration and the relative arrangement of the gauge plate and the gauge plate-supporting base thereof can vary from the embodiment shown.

Slicing Thickness Adjuster

Referring to FIGS. 4 to 7, 13A and 13B, in the embodiment shown, the food-slicing apparatus 100 further comprises a slicing thickness adjuster 850 to configure the manual food-slicing apparatus 100 in a plurality of slicing thickness settings (i.e., to displace the gauge plate 820 with respect to the cutting disk 300 so as to define different slicing thicknesses Ts1, Ts2 with the cutting plane defined by the cutting disk 300).

For instance, the slicing thickness adjuster 850 comprises a plurality of thickness adjusting teeth 852 formed on the blade-supporting base 200 (for instance on the base member 210 thereof) forming for instance two parallel tooth rows 853. The thickness adjusting teeth 852 are shaped and dimensioned to cooperate with a thickness-adjusting toothed wheel 854 mounted to the gauge plate assembly 800 (for instance extending downwardly from the gauge base 830 thereof). In the embodiment shown, the toothed wheel 854 is rotatably mounted to the gauge base 830 (for instance about a substantially vertical axis when the food-slicing apparatus 100 is supported on a substantially horizontal supporting surface). For instance, the toothed wheel 854 is formed integral with an actuating ring 855 extending from an upper surface of the gauge base 830.

Figure 5:
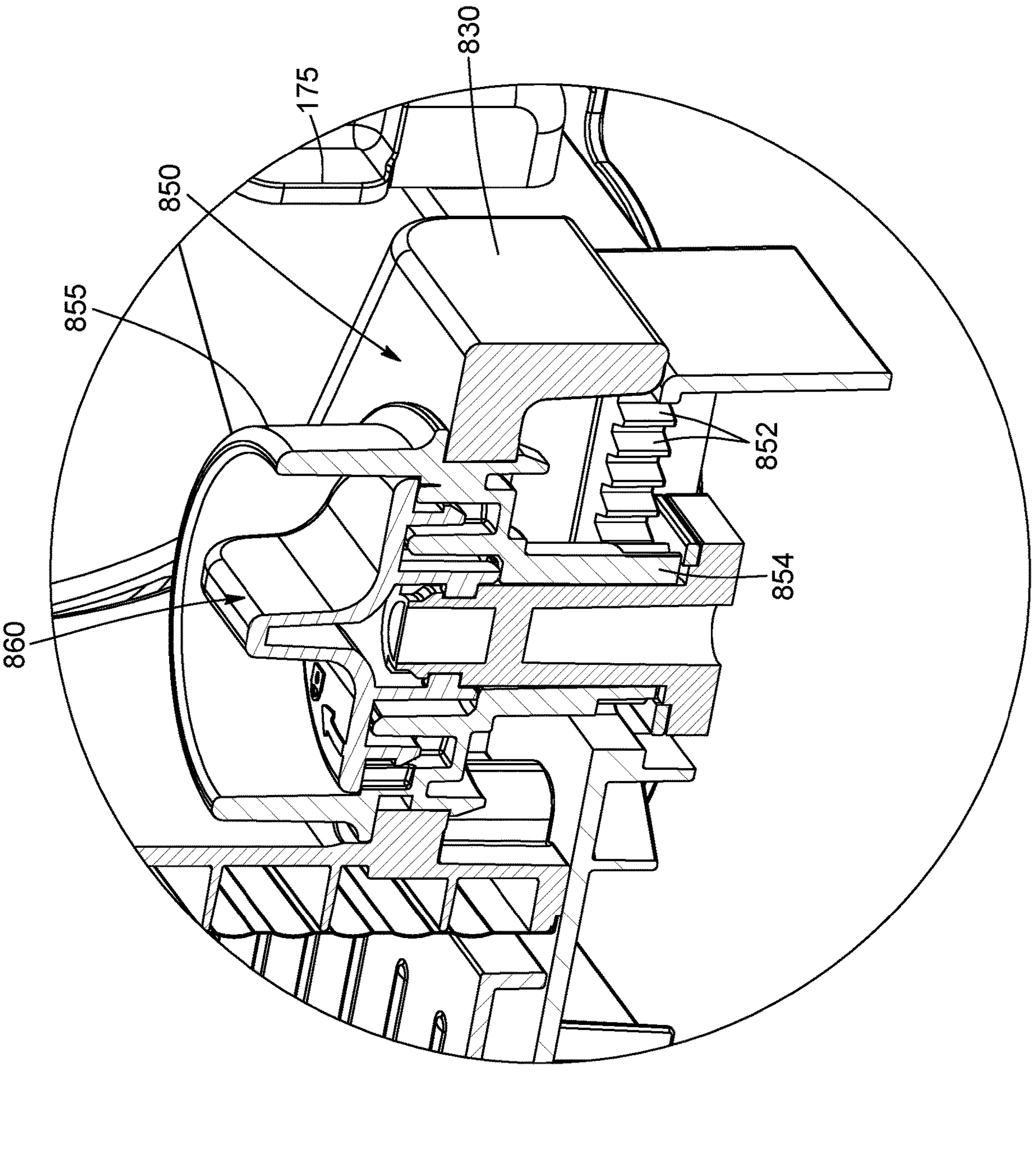
FIG. 5 is a cross-sectional view of a slicing thickness adjuster of the food-slicing apparatus of FIG. 4, taken along cross-section lines A-A thereof.
Figure 7:
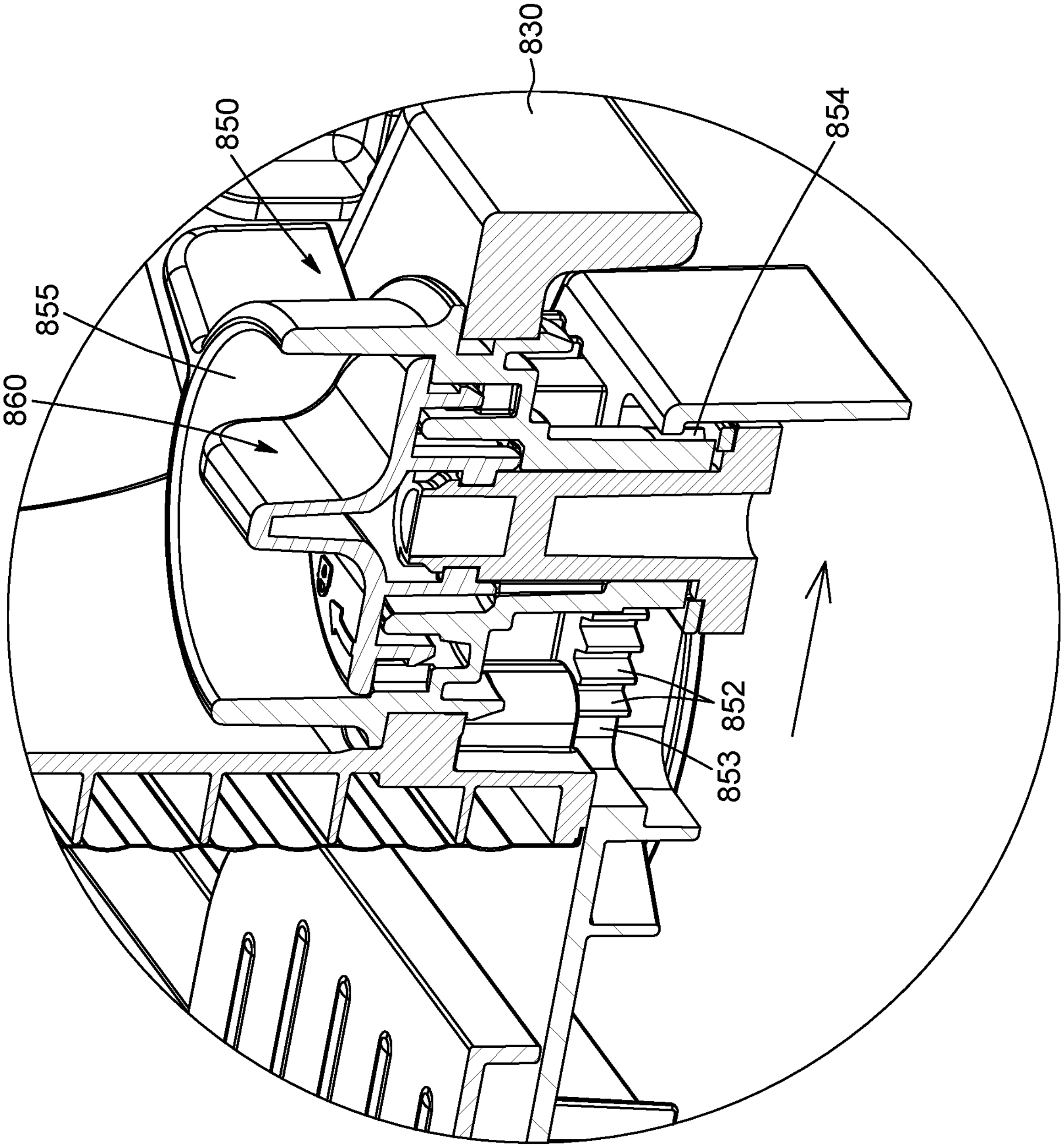
FIG. 7 is a cross-sectional view of the slicing thickness adjuster of the food-slicing apparatus of FIG. 6, taken along cross-section lines B-B thereof.

As best shown in FIGS. 5 and 7, upon rotation of the toothed wheel 854 (i.e., upon rotation of the actuating ring 855), the toothed wheel 854 is displaced along the tooth rows 853 to displace the gauge plate assembly 800 with respect to the blade-supporting base 200 (i.e., to displace the gauge plate 820 with respect to the cutting disk 300, i.e., to adjust the slicing thickness).

In the embodiment shown, the slicing thickness adjuster 850 further comprises a thickness adjuster locker 860 to configure the slicing thickness adjuster 850 either in a locked configuration wherein the gauge plate assembly 800 is not displaceable with respect to the blade-supporting base 200 (thus allowing a safe use of the food-slicing apparatus to make slices of the food item having a substantially similar thickness), or in an unlocked configuration wherein the gauge plate assembly 800 is displaceable with respect to the blade-supporting base 200 upon rotation of the toothed wheel 854 (i.e., upon rotation of the actuating ring 855).

Figure 13B:
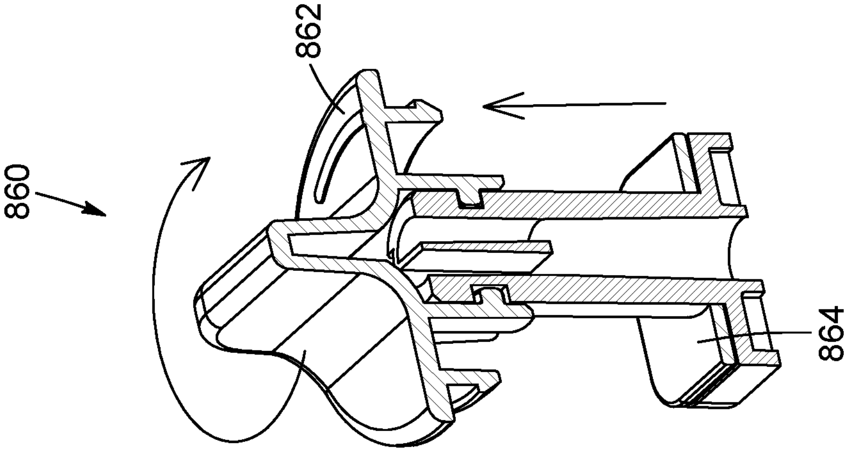
FIGS. 13A and 13B are top perspective views, partially sectioned, of a thickness adjuster locker of the slicing thickness adjuster, respectively exploded and in a locked configuration.
Figure 13A:
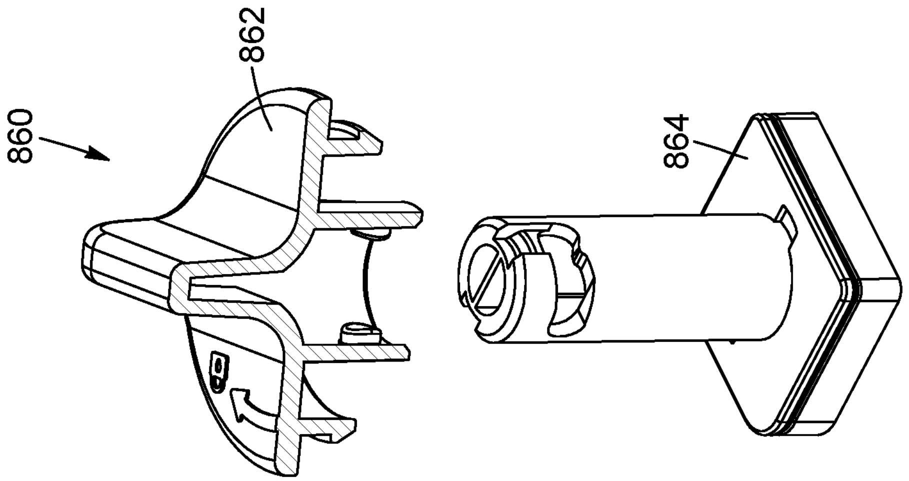
Figure 14A:
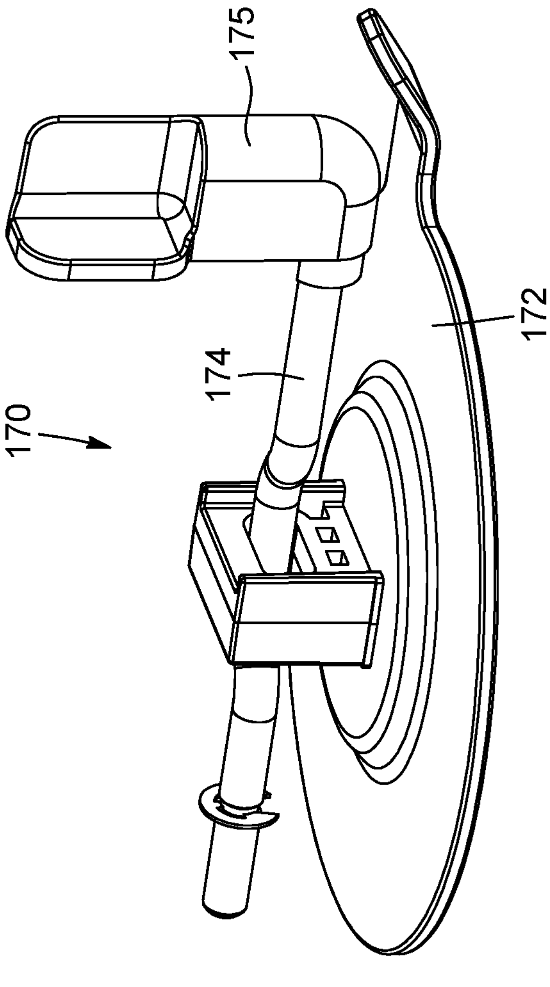
FIGS. 14A and 14B are top perspective views of a stabilizing assembly in accordance with an embodiment, respectively in disabled and actuated configurations.
Figure 14B:
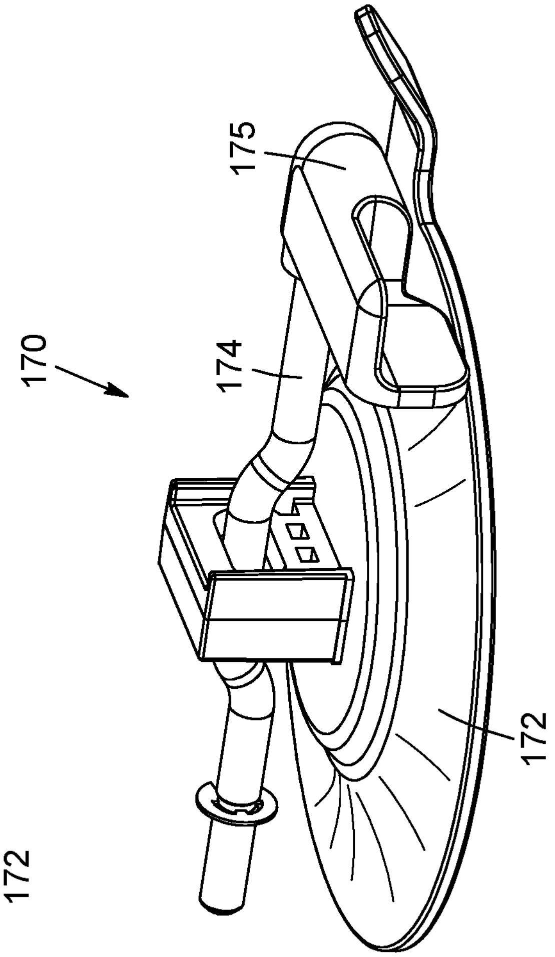

For instance, referring to FIGS. 13A and 13B, the thickness adjuster locker 860 comprises a rotating locking knob 862 at least partially surrounded by the actuating ring 855 and operatively coupled to a blocking pad 864. Upon rotation of the rotating locking knob 862, the blocking pad 864 is either abutted against at least some of the thickness adjusting teeth 852, thus preventing the displacement of the toothed wheel 854 along the tooth rows 853, or spaced apart from the thickness adjusting teeth 852, thus allowing the displacement of the toothed wheel 854 along the tooth rows 853 upon rotation of the actuating ring 855.

It is understood that the above-mentioned operating and storage lengths are slightly variable depending on the selected slicing thickness. A compactness ratio, defined as a ratio between the storage length and the operating length, should thus be understood for a given slicing thickness.

The present disclosure is not limited to a slicing thickness adjuster comprising tooth rows formed on the blade-supporting base configured to cooperated with a toothed wheel rotatably mounted to the gauge plate assembly. It is appreciated that the shape, the configuration, and the location of the slicing thickness adjuster can vary from the embodiment shown.

Stabilizing Assembly

Referring now to FIGS. 2, 3, 14A and 14B, in the embodiment shown, the food-slicing apparatus 100 also comprises a stabilizing assembly 170, for instance mounted to the blade-supporting base 200 (for instance to the base member 210 thereof) which is shaped and dimensioned to contribute to a stability of the food-slicing apparatus 100 when in use (i.e., when configured in the cutting configuration).

In the embodiment shown, the stabilizing assembly 170 comprises a suction cup foot 172 operatively coupled to a stabilizer actuator 174 having an actuating portion 175 extending outwardly from the blade-supporting base 200 (for instance from the base member 210 thereof). In the embodiment shown, the stabilizer actuator 174 is pivotably mounted to the blade-supporting base 200 and upon pivoting of the stabilizer actuator 174, the suction cup foot 172 is configurable either into a disabled configuration (FIG. 14A) wherein the blade-supporting base 200 can be easily removed from the slicing apparatus-supporting surface (for instance the counter or kitchen countertop) and an actuated configuration (or stabilizing configuration) wherein an upward pulling force is exerted on the suction cup foot 172 thus limiting via a suction effect a removal of the blade-supporting base 200 from the slicing apparatus-supporting surface.

For instance, the suction cup foot 172 is at least partially made of rubber or any other suitable material to create a suction effect upon exerting an upward pulling force thereon. In the embodiment shown, the suction cup foot 172 is substantially disk-shaped and a diameter of the suction cup foot is substantially equal to a width Wb of the blade-supporting base 200.

It is appreciated that the shape, the configuration, and the location of the stabilizing assembly can vary from the embodiment shown. It could also be conceived a food-slicing apparatus having no stabilizing assembly.

It is thus understood that the manual food-slicing apparatus 100 according to the present disclosure is shaped and dimensioned to have limited dimensions when not in use (when configured in the storage configuration). As detailed above, the pivoting of the food-guiding platform 400 about the platform pivoting axis X3, the removing of the hand crank 500 and its engagement with the crank-receiving aperture 251 formed in the base member 210, the configuration of the gauge plate assembly 800 into a minimal slicing thickness setting and the mounting of the different components of the food-pushing assembly 700 to the counter-facing surface 405 of the food-guiding platform 400 contribute to limiting the dimensions of the manual food-slicing apparatus 100 when configured in the storage configuration.

Method for Manually Slicing a Food Item

Figure 15:
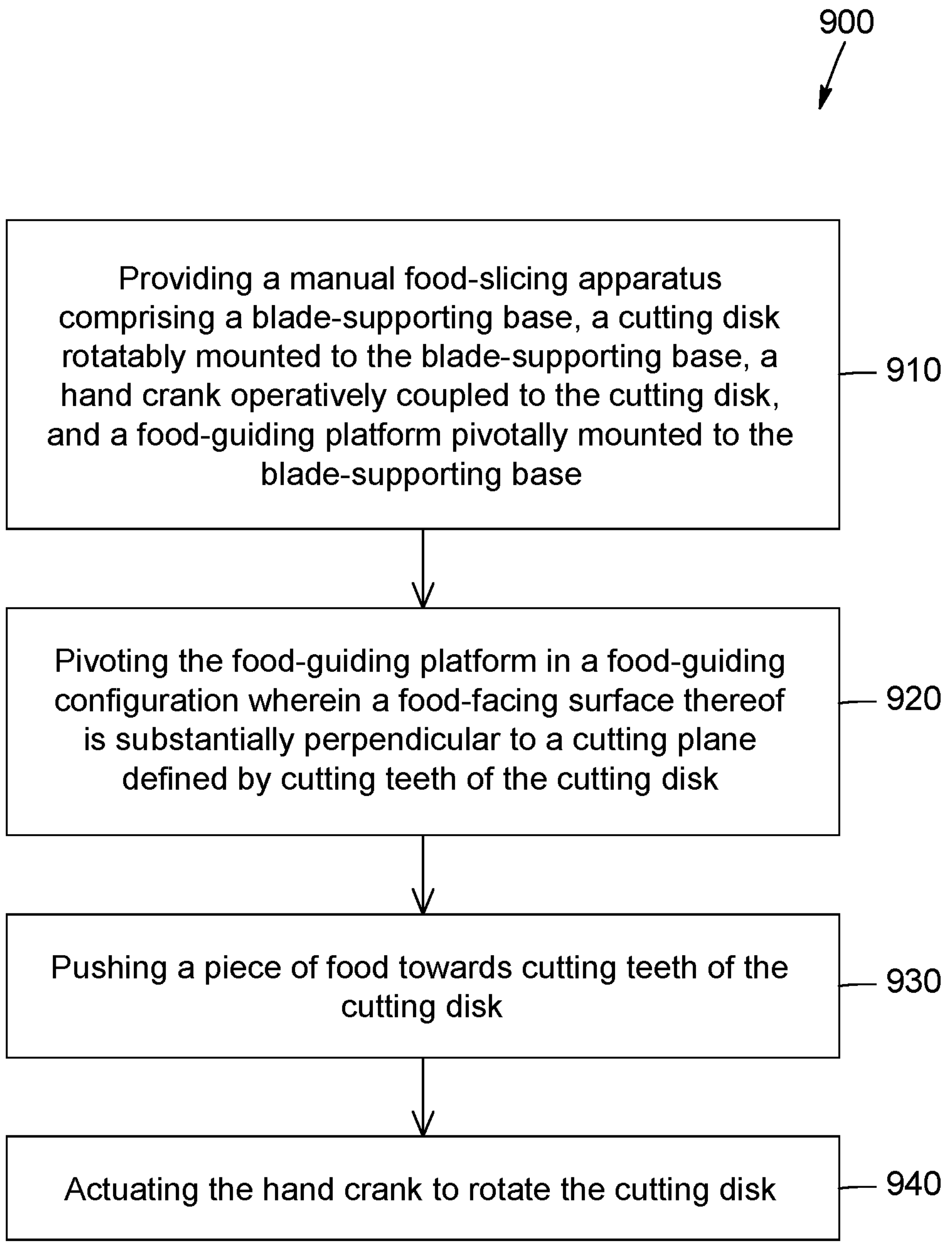
FIG. 15 is a block diagram showing the different steps of a method of manually slicing a food item in accordance with an embodiment.

According to another aspect of the disclosure and referring to FIG. 15, there is provided a method 900 for manually slicing a food item.

The method 900 according to embodiments of the present disclosure may be carried out with a foldable manual food-slicing apparatus 100 such as those described above.

In the embodiment shown, the method 900 comprises a step 910 of providing a manual food-slicing apparatus 100 comprising a blade-supporting base 200, a cutting disk 300 rotatably mounted to the blade-supporting base 200 about a rotation axis X1 and comprising a plurality of cutting teeth 310 disposed on an outer periphery 302 thereof and defining a cutting plane, a hand crank 500 operatively coupled to the cutting disk 300, and a food-guiding platform 400 pivotally mounted to the blade-supporting base 200 and comprising a food-facing surface 402. The method 900 further comprises a step 920 of pivoting the food-guiding platform 400 in a food-guiding configuration wherein the food-facing surface 402 is substantially perpendicular to the cutting plane, a step 930 of pushing a piece of food towards the cutting teeth 310 of the cutting disk 300, and a step 940 of actuating the hand crank 500 to rotate the cutting disk 300.

In the embodiment shown, the food-slicing apparatus 100 further comprises a food-pushing assembly 700 removably mounted to a counter-facing surface of the food-guiding platform 400 and slidable along at least a portion of the food-facing surface of the food-guiding platform, the method further comprising a step of pushing the piece of food towards the cutting disk via the food-pushing assembly.

In the embodiment shown, the method 900 also comprises a step of removing the food-pushing assembly from a counter-facing surface of the pivoting food-guiding platform 400 and engaging the food-pushing assembly with the piece of food to push the piece of food towards the cutting teeth of the cutting disk.

Several alternative embodiments and examples have been described and illustrated herein. The embodiments of the invention described above are intended to be exemplary only. A person of ordinary skill in the art would appreciate the features of the individual embodiments, and the possible combinations and variations of the components. A person of ordinary skill in the art would further appreciate that any of the embodiments could be provided in any combination with the other embodiments disclosed herein. It is understood that the invention may be embodied in other specific forms without departing from the central characteristics thereof. The present examples and embodiments, therefore, are to be considered in all respects as illustrative and not restrictive, and the invention is not to be limited to the details given herein. Accordingly, while the specific embodiments have been illustrated and described, numerous modifications come to mind. The scope of the invention is therefore intended to be limited by the scope of the appended claims.

What is claimed is:

1. A manual food-slicing apparatus, comprising:

a blade-supporting base;

a cutting disk rotatably mounted to the blade-supporting base and comprising a plurality of cutting teeth disposed on an outer periphery thereof; and a food-guiding platform comprising a food-facing surface and a counter-facing surface opposed to the food-facing surface;

wherein the food-guiding platform is pivotably mounted to the blade-supporting base to configure the food-slicing apparatus into a cutting configuration in which the food-facing surface of the food-guiding platform is substantially perpendicular to a cutting plane defined by the cutting teeth and a storage configuration in which the food-facing surface of the food-guiding platform is substantially parallel to the cutting plane;

the food-slicing apparatus further comprising a food-supporting plate configurable into a food-pushing configuration wherein the food-supporting plate is slidable along at least a portion of the food-facing surface of the food-guiding platform when the food-slicing apparatus is configured in the cutting configuration, the food-supporting plate being engageable with a piece of food to push said piece of food towards the cutting teeth of the cutting disk;

wherein the food-supporting plate is removably mounted to the counter-facing surface of the food-guiding platform when the food-slicing apparatus is configured into the storage configuration;

wherein the food-supporting plate has a food-supporting surface, the food-slicing apparatus further comprising a food-engaging wall extending upwardly from the food-supporting surface of the food-supporting plate and being slidable along at least a portion of the food-supporting surface; and wherein the food-engaging wall is separatable from the food-supporting plate, the food-engaging wall and the food-supporting plate being engageable respectively with first and second portions of the counter-facing surface of the food-guiding platform when the food-slicing apparatus is in the storage configuration.

2. The food-slicing apparatus according to claim 1, wherein a guiding slot is formed at a junction of the blade-supporting base and the food-guiding platform, the-food-supporting plate being at least partially insertable in the guiding slot when the food-slicing apparatus is configured in the cutting configuration.

3. The food-slicing apparatus according to claim 1, further comprising a hand-protecting wall pivotally mounted to the food-supporting plate and configurable into a hand-protecting configuration wherein the food-supporting wall extends upwardly from the food-supporting surface of the food-supporting plate.

4. The food-slicing apparatus according to claim 1, wherein, when configured in the storage configuration, a substantial entirety of a surface area of the counter-facing surface is covered by the food-supporting plate and the food-engaging wall.

5. The food-slicing apparatus according to claim 3, further comprising a plate locking assembly configured to prevent the hand-protecting wall from pivoting with respect to the food-supporting plate, the plate locking assembly comprising a locking slot formed in one of the hand-protecting wall and the food-supporting plate configured to receive at least partially a mobile locking tab slidably mounted to the other one of the hand-protecting wall and the food-supporting plate.

6. The food-slicing apparatus according to claim 1, the cutting disk being rotatably mounted to the blade-supporting base about a rotation axis, wherein the blade-supporting base comprises a base member and the food-slicing apparatus comprises a hand crank removably mounted to the blade-supporting base and operatively couplable to the cutting disk to rotate the cutting disk about the rotation axis, wherein the hand crank comprises a gripping portion and a gear-engaging portion and wherein the hand crank is configurable into an actuating configuration wherein the gear-engaging portion extends substantially parallel to the rotation axis of the cutting disk, and into a storage configuration wherein the gear-engaging portion extends upwardly from the base member of the blade-supporting base.

7. The food-slicing apparatus according to claim 1, comprising a stabilizing assembly mounted to the blade-supporting base and comprising a suction cup foot and a stabilizer actuator pivotably mounted to the blade-supporting base and operatively coupled to the suction cup foot to exert an upward pulling force on the suction cup foot upon pivoting of the stabilizer actuator, thus configuring the suction cup foot into a stabilizing configuration, the suction cup being configured into a disabled configuration wherein no pulling force is exerted by the stabilizer actuator on the suction cup foot.

8. A manual food-slicing apparatus, comprising:

a blade-supporting base;

a cutting blade rotatably mounted to the blade-supporting base about a rotation axis and comprising a plurality of cutting teeth disposed on an outer periphery thereof and defining a cutting plane; and a food-guiding platform comprising a food-facing surface;

wherein the food-guiding platform is pivotably mounted to the blade-supporting base to configure the food-slicing apparatus into a cutting configuration in which the food-slicing apparatus has an operating length considered along the rotation axis, and into a storage configuration in which the food-slicing apparatus has a storage length considered along the rotation axis, the storage length being smaller than 60% of the operating length;

wherein the food-slicing apparatus further comprises a gauge plate assembly mounted to the blade-supporting base and comprising a gauge plate extending substantially parallel to and spaced apart from the cutting plane to define therewith a slicing thickness, the food-slicing apparatus further comprising a slicing thickness adjuster to configure the gauge plate in at least two positions with respect to the cutting blade so as to define at least two different slicing thicknesses;

the slicing thickness adjuster comprising a plurality of thickness adjusting teeth formed on one of the blade-supporting base and the gauge plate assembly, the thickness adjusting teeth being shaped and dimensioned to cooperate with a thickness-adjusting toothed wheel mounted to the other one of the blade-supporting base and the gauge plate assembly;

wherein the blade-supporting base comprises a base member, wherein the gauge plate assembly comprises a gauge plate-supporting plate extending upwardly from the base member and supporting the gauge plate, and a gauge base mounted to the base member, the toothed wheel being rotatably mounted the gauge base;

wherein the slicing thickness adjuster further comprises a thickness adjuster locker to configure the slicing thickness adjuster either in a locked configuration wherein the gauge plate assembly is not displaceable with respect to the blade-supporting base or in an unlocked configuration wherein the gauge plate assembly is displaceable with respect to the blade-supporting base upon rotation of the toothed wheel; and wherein the toothed wheel is formed integral with an actuating ring extending from an upper surface of the gauge base, the thickness adjuster locker comprising a rotating locking knob at least partially surrounded by the actuating ring and operatively coupled to a blocking pad, wherein, upon rotation of the rotating locking knob, the blocking pad is either abutted against at least some of the thickness adjusting teeth, or spaced apart from the thickness adjusting teeth.

9. The food-slicing apparatus according to claim 8, wherein the food-slicing apparatus comprises a hand crank removably mounted to the blade-supporting base and operatively couplable to the cutting blade to rotate the cutting blade about the rotation axis, wherein the hand crank comprises a gripping portion and a gear-engaging portion, wherein when in the cutting configuration, the gear-engaging portion extends substantially parallel to the rotation axis of the cutting blade, and when in the storage configuration, the gear-engaging portion extends upwardly from the base member of the blade-supporting base.

10. The food-slicing apparatus according to claim 8, comprising a food-supporting plate slidable along at least a portion of the food-facing surface of the food-guiding platform when the food-slicing apparatus is configured in the cutting configuration and engageable with a piece of food to push said piece of food towards the cutting teeth of the cutting blade, wherein a guiding slot is formed at a junction of the blade-supporting base and the food-guiding platform, the-food-supporting plate being at least partially insertable in the guiding slot.

11. The food-slicing apparatus according to claim 10, wherein the food-supporting plate has a food-supporting surface, the food-slicing apparatus further comprising a food-engaging wall extending upwardly from the food-supporting surface of the food-supporting plate and being slidable along at least a portion of the food-supporting surface.

12. The food-slicing apparatus according to claim 11, further comprising a hand-protecting wall pivotally mounted to the food-supporting plate and configurable into a hand-protecting configuration wherein the food-supporting wall extends upwardly from the food-supporting surface of the food-supporting plate.

13. The food-slicing apparatus according to claim 10, the food-guiding platform comprising a counter-facing surface opposed to the food-facing surface, wherein the food-supporting plate is configurable into a food-pushing configuration when the food-slicing apparatus is configured in the cutting configuration, wherein the food-supporting plate is slidable along said at least a portion of the food-facing surface of the food-guiding platform, and wherein the food-guiding platform is transferable into the storage configuration wherein the food-supporting plate is removably mounted to the counter-facing surface of the food-guiding platform.

14. The food slicing apparatus according to claim 3, wherein, when configured in the storage configuration, a food-facing surface of the hand-protecting wall is superposed to the food-supporting surface of the food-supporting plate.

15. The food-slicing apparatus according to claim 8, comprising a stabilizing assembly mounted to the blade-supporting base and comprising a suction cup foot and a stabilizer actuator pivotably mounted to the blade-supporting base and operatively coupled to the suction cup foot to exert an upward pulling force on the suction cup foot upon pivoting of the stabilizer actuator, thus configuring the suction cup foot into a stabilizing configuration, the suction cup being configured into a disabled configuration wherein no pulling force is exerted by the stabilizer actuator on the suction cup foot.

16. The food-slicing apparatus according to claim 11, wherein, when configured in the storage configuration, a substantial entirety of a surface area of the counter-facing surface is covered by the food-supporting plate and the food-engaging wall.

* * * * *